United States Patent [19]
Campbell et al.

[11] Patent Number: 6,083,682
[45] Date of Patent: Jul. 4, 2000

[54] SYSTEM AND METHOD FOR SOLID-PHASE PARALLEL SYNTHESIS OF A COMBINATORIAL COLLECTION OF COMPOUNDS

[75] Inventors: David A. Campbell, East Haven, Conn.; Valery V. Antonenko, Cupertino; Harold E. Selick, Belmont, both of Calif.

[73] Assignee: Glaxo Group Limited, Greenford, United Kingdom

[21] Appl. No.: 08/994,802

[22] Filed: Dec. 19, 1997

[51] Int. Cl.[7] .............................. C12Q 1/00; B01L 11/00
[52] U.S. Cl. ............................... 435/4; 422/130; 422/134
[58] Field of Search .................... 422/130, 129, 422/131, 134, 101, 98; 436/578; 435/4, DIG. 49

[56] References Cited

U.S. PATENT DOCUMENTS

| | | |
|---|---|---|
| 4,111,754 | 9/1978 | Park . |
| 4,493,815 | 1/1985 | Ferwood et al. . |

(List continued on next page.)

FOREIGN PATENT DOCUMENTS

| | | | |
|---|---|---|---|
| 0 403 679 | 12/1990 | European Pat. Off. .......... | B01L 3/00 |
| 0 787527 | 8/1997 | European Pat. Off. .......... | B01J 19/00 |
| 19602464 | 7/1997 | Germany .......................... | B01J 19/00 |
| 1 509 826 | 4/1978 | United Kingdom ............. | C12K 9/00 |
| WO90/02605 | 3/1990 | WIPO .............................. | B01J 19/00 |
| WO91/07504 | 5/1991 | WIPO .............................. | C12Q 1/68 |
| WO92/02303 | 2/1992 | WIPO .............................. | B01L 3/00 |
| WO 94/05394 | 3/1994 | WIPO .............................. | B01D 25/12 |
| WO94/06902 | 6/1994 | WIPO .............................. | C12M 3/06 |
| WO94/14972 | 7/1994 | WIPO .............................. | C12P 19/34 |
| WO95/01559 | 1/1995 | WIPO .............................. | G01N 1/28 |
| WO95/11262 | 4/1995 | WIPO .............................. | C08F 2/04 |
| WO 96/03212 | 2/1996 | WIPO .............................. | B01L 3/00 |
| WO 96/16078 | 5/1996 | WIPO .............................. | C07K 1/04 |
| WO96/30761 | 10/1996 | WIPO .......................... | G01N 33/53 |
| WO96/33010 | 10/1996 | WIPO .............................. | B01J 8/06 |
| WO96/42004 | 12/1996 | WIPO . | |
| WO97/06890 | 2/1997 | WIPO .............................. | B01L 3/00 |
| WO97/09353 | 3/1997 | WIPO .............................. | C08F 2/00 |
| WO97/10896 | 3/1997 | WIPO .............................. | B01J 19/00 |
| WO 97/42216 | 11/1997 | WIPO .............................. | C07K 1/04 |
| WO 97/45455 | 12/1997 | WIPO .............................. | C08F 2/00 |
| WO97/45443 | 12/1997 | WIPO . | |
| WO98/05424 | 2/1998 | WIPO .............................. | B01L 3/00 |
| WO98/06490 | 2/1998 | WIPO .............................. | B01J 19/00 |
| WO98/08092 | 2/1998 | WIPO .......................... | G01N 33/53 |

OTHER PUBLICATIONS

Frank et al. (1988), "Simultaneous multiple peptide synthesis under continuous flow conditions on cellulose paper discs as segmental solid supports," Tetrahedron 44:6031–6040.

Baiga (1998), "Integrated Instrumentation for High–Throughput Organic Synthesis," Presented at Cambridge Healthtech Institute's Third Annual Symposium "High–Throughout Organic Synthesis", Mar. 5–6, Coronodo, California.

(List continued on next page.)

*Primary Examiner*—Bennett Celsa
*Assistant Examiner*—Joseph W. Riciyliano
*Attorney, Agent, or Firm*—Darin J. Gibby; Lauren L. Stevens

[57] ABSTRACT

The invention provides a system and method for synthesizing chemicals onto supports in a parallel manner to produce a combinatorial collection of compounds. The system includes a plurality of middle plates, with each middle plate defining a plurality of reaction zones arranged in a two dimensional array. The reaction zones are adapted to receive a solid support, such as a sheet of membrane, and the middle plates are stackable on each other to form a three dimensional array of reaction zones. The system also includes a pair of end plates, where the middle plates are located between the end plates, and where the end plates include an array of fluid guides corresponding to the array of reaction zones, to allow for selective routing of reagents through the reaction zones.

28 Claims, 13 Drawing Sheets

U.S. PATENT DOCUMENTS

| | | |
|---|---|---|
| 4,526,690 | 7/1985 | Kiovsky et al. . |
| 4,598,049 | 7/1986 | Zelinka et al. . |
| 4,894,343 | 1/1990 | Tanaka et al. . |
| 4,948,442 | 8/1990 | Manns . |
| 5,047,215 | 9/1991 | Manns . |
| 5,108,704 | 4/1992 | Bowers et al. . |
| 5,147,608 | 9/1992 | Hudson et al. . |
| 5,183,744 | 2/1993 | Kawamura et al. . |
| 5,186,844 | 2/1993 | Burd et al. . |
| 5,219,528 | 6/1993 | Clark . |
| 5,272,081 | 12/1993 | Weinreb et al. . |
| 5,273,718 | 12/1993 | Sköld et al. . |
| 5,288,464 | 2/1994 | Nokihara . |
| 5,308,757 | 5/1994 | Kawamura et al. . |
| 5,324,483 | 6/1994 | Cody et al. . |
| 5,384,261 | 1/1995 | Winkler et al. . |
| 5,457,527 | 10/1995 | Manns et al. . |
| 5,472,672 | 12/1995 | Brennan . |
| 5,503,805 | 4/1996 | Sugarman et al. . |
| 5,506,141 | 4/1996 | Weinreb et al. . |
| 5,516,491 | 5/1996 | Kath et al. . |
| 5,529,756 | 6/1996 | Brennan . |
| 5,565,324 | 10/1996 | Still et al. . |
| 5,585,275 | 12/1996 | Hudson et al. . |
| 5,599,688 | 2/1997 | Grass . |
| 5,604,130 | 2/1997 | Warner et al. . |
| 5,609,826 | 3/1997 | Cargill et al. . |
| 5,620,894 | 4/1997 | Barger et al. . |
| 5,622,699 | 4/1997 | Ruoslathi et al. . |
| 5,639,428 | 6/1997 | Cottingham . |
| 5,650,489 | 7/1997 | Lam et al. . |
| 5,665,975 | 9/1997 | Kedar . |
| 5,688,696 | 11/1997 | Lebl . |
| 5,712,171 | 1/1998 | Zambias et al. . |
| 5,725,831 | 3/1998 | Reichler et al. . |
| 5,770,157 | 6/1998 | Cargill et al. . |

OTHER PUBLICATIONS

Baldwin et al. (1995), "Synthesis of a Small Molecule Library Encoded with Molecular Tags," J. Am. Chem. Soc. 117:5588–5589.

Bergot (1988), "Combinatorial Chemistry Workstation to Facilitate Pharmaceutical Development," Presented at Cambridge Healthtech Institute's Third Annual Symposium "High–Throughput Organic Synthesis", Mar. 5–6, Coronodo, Callifornia.

Brenner and Lerner (1992), "Encoded combinatorial Chemistry," Proc. Natl. Acad. Sci. U.S.A. 89:5381–5383.

Campbell (1998), "Automating Solid–Phase Synthesis without Compromise," Presented at Cambridge Healthtech Institute's Third Annual Symposium "High–Throughput Oroganic Synthesis," Mar. 5–6, Coronodo California.

Cargill et al. (1995), "Automated Combinatorial Chemistry on Solid Phase," Proceedings of the International Symposium on laboratory Automation and Robotics 1995. Zymark Corportion, Zymark Center, Hopkinton, MA, pp. 221–234.

Cargill et al. (1996), "Automated Combinatorial Chemistry on Solid Phase," Laboratory Robotics and automation, 8:139–148.

Czarnik, A.W. (1997) No sattic at all: using radiofrequency memory tubes without (human) interference. Abstract at the Association for Laboratory Automation Labautomation' 97 Conference, 1997 Jan. 18–22, San Diego. On The World Wide Web URL http://labautomation.org.

Czarnik and Nova (1997), "No static at all." Chemistry in Britain, Oct., pp. 39–41.

DeWitt et al. (1996), Combinatorial Organic Synthesis Using Park–Davis "DIVERSOMER Method," Acc. Chem. Res. 29:114–112.

DeWitt et al. (1994), "DIVERSOMER technology: solid phase synthesis, automation, and integration for the generation of chemical diversity," Drug Dev. Res. 33:116–124.

DeWitt et al. (1996), "A modular System for combinatorial and Automated Synthesis" in "Molecular Diversity and Combinatorial Chemistry: Libraries and Drug Discovery. ACS Conference Proceedings Series" (Chaiken and Janda Eds.) pp. 207–218. American Chemical Society, Washington D.C.

DeWitt et al. (1995), "Automated synthesis and combinatorial chemistry," current Opinion in Biotechnology 6:640–645.

DeWitt et al. (1993), "Diversomer": An approach to non–peptide, nonoligomeric chemical diversity. Proc. Natl. Acad. Sci. U.S.A. 90:690–6913.

Floyd et al. (1997), "The Automated Synthesis of Organic Compounds—Some Newcomers Have Some Success" in "Proceedinngs of the International Symposium on Laboratory Automation and Robotics 1996" pp. 51–76. Zymark Corporation, Zymark Center, Hopkinton, MA.

Furka et al. (1991), "General Method for rapid synthesis of multicomponent peptide mixtures," Int. J. Pept. Protein Res. 37:487–493.

Gooding et al. (1996), "Boosting thre Productivity of Medicinal Chemistry Through Automation Tools, Novel Technological Developments Enable a Wide Range opf Automated Synthetic Procedures" in "Molecular Diversity and Combinatorial chemistry: Libraries and Drug Discovery. ACS Conference Proceedings Series"(Chaiken et al.) pp. 199–206. American Chemical Society, Washington, D.C.

Harness (1996), "Automation of High–Throughput Synthesis. Automated Laboratory Workstations Designed to Perform and Support Combinatorial Chemistry" in "Molecular Diversity and Combinatorial Chemistry: Libraries and Drug Discovery. ACS Conference Proceedings Series" (Chaiken et al.) pp. 188–198. American Chemical Society, Wahington, D.C.

Kerr et al. (1993), "Encoded Combinatorial peptide libraries containing non–natural amino acids," J. Am. Chem. Soc. 115:2529–2531.

Lam et al.(1991), "A New type of synthetic peptide library for identifying ligand–binding activity," Nature (London), 354:82–84.

Lashkari et al. (1995), "An automated multiplex oligonucleotide synthesizer: Development of high–throughout, low–cost DNA synthesis,"Proc. Natl. Acad. Sci. USA 92:7912–7915.

Lebl et al. (1995), "One–bead–one–structure combinatorial libraries,"Biopolymers, 37:177–198.

Meyers et al. (1996), "Versatile method for parallel synthesis," Methods Mol. Cell. Biol. (1996), 6:67–73.

Meyers et al., "Multiple simultaeous synthesis of phenolic libraries," ESCOM Science Publishers B.V., Lieden, The Netherlands, Copyright 1995, Mol. Diversity, 1:13–20.

"Millipore MultiScreen Assay System," Brochure, Millpore Corporation, Bedford, MA 01730, rev. B 9/91,14 pages.

Mjalli (1997), "Application of Automated Parallel Synthesis" in "A Practical Guide to Combinatorial Chemistry" (Czarnik et al.) pp. 327–354. American Chemical Society, Washington, DC.

Moran et al. (1995), "Radio Frequency Tag Encoded Combinatorial Library Method for the Discovery of Tripeptide–Substituted Cinnamic Acid Inhibitors of the Protein Tyrosine Phosphatase PTP1B," J. Am. Chem. Soc. 117:10787–10788.

MULTIBLOCK—Instrument for multiple and combinatorial synthesis—Brief Description and User'Manual, five pages. No date—Not a Printable Reference.

Nakazawa (1994), "Chapter 20. The anistropic principle," in Principles of Precision Engineering, Oxford University Press, pp. 212–228.

Nestler et al. (1994), "A General Method for Molecular Taggin of Encoded Combinatorial Chemistry Libraries," J. Org. Chem. 59:4723–4724.

Ni et al. (1996), "Versatile Approach to Encoding combinatorial Organic Synthesis Using Chemically Robust Secondary Amine Tags," J. Med. Chem. 39:1601–1608.

Nicolau et al. (1995), "Radiofrequency encoded combinatorial chemistry,"Angew. Chem. Int. Ed. 34:2289–2291.

Nielsen et al. (1993), "Synthetic methods for the implementation of enoded combinatorial chemistry," J. Am. Chem. Soc. 115:9812–9813.

Nikolaev et al. (1993), "Peptide–encoding for structure determination of nonsequenceable polymers within libraries synthesized and tested on solid–phas supports," Pept. Res. 6:161–170.

Ohlmeyer et al. (1993), "Complex synthetic chemical libraries indexed with molecular tags," Proc. Natl. Acad. Sci. U.S.A. 90:10922–10926.

Porco et al. (1998), "Automated chemical synthesis: chemistry development on the Nautilus 2400TM," Drugs of the Future 23:71–78.

Powers et al. (1998), "Personal Synthesizer of HTS," Genetic Eng. News, 18, No. 3, p. 14.

Rivero et al. (1997), "Equipment fo the High–Throughput Organic Synthesis of Chemical Libraries" in "A Practical Guide to combinatorial chemistry" (Czarnik et al.) pp. 281–307. American Chemical Society, Wahington, DC.

Sagian Incorporated Product Brochure, "ALCHEMY 2000 Automated Reaction System," three pages. No Date Not a Printable reference.

Salmon et al. (1993)m, "Discovey of biologically active peptides in random libraries; solution–phase testing after staged orthogonal release from resin beads,"Proc. Natl. Acad. Sci. U.S.A. 90:11708–11712.

Stanchfield (1997), "FlexChemTM: A Modular System for High Throughput Synthesis of Small Molecules," Robbins Innovations, 5, No. 4, pp. 1–6.

Stanchfield (1998), "A Flexible, Modular System for Performing High–Throughput Synthesis of Small Molecules," Presented at Cambridge Healthtech Institute's Third Annual Symposium "High–Throughput Organic Synthesis", Mar. 5–6, Coronado, California.

Veldkamp and McHugh (May 1992), "Binary Optics," Scietific American, pp. 92–97.

Whitten et al. (1996), "Rapid Microscale Synthesis, a New Method for Lead optimization Using Robotics and Solution Phase Chemistry: Application to the Synthesis and Optimization of Corticotropin–Releasing Factor Receptor Antagonists," J. Med. Chem. 39:4354–4357.

SYSTEM AND METHOD FOR SOLID-PHASE PARALLEL SYNTHESIS OF A COMBINATORIAL COLLECTION OF COMPOUNDS

FIELD OF THE INVENTION

The invention relates generally to the field of chemical synthesis, and in particular to the synthesis of various chemicals onto supports in a parallel manner to produce a combinatorial collection of compounds.

REFERENCES

Barany, et al., *J. Am. Chem. Soc.* 107: 4936 (1985).

Beebe, X., et al., *J. Am. Chem. Soc.* 114:10061 (1992).

Bellof and Mutter *Chimia* 39:10 (1985).

Bunin, B. A., and Ellman, J. A., *J. Am. Chem. Soc.* 114:10997 (1992).

Bunin, B. A., et al., *Proc. Natl. Acad. Sci. U.S.A.* 91:4708 (1994).

Daniels, S. B., et al., *Pept. Chem., Struct. Biol., Proc. Am. Pept. Symp., 11th:* 1027–8. Rivier, J. E. and Marshall, G. R., eds. ESCOM Sci. Pub., Leiden, Neth. (1990).

Dower, et al., U.S. Pat. No. 5,639,603, Issued Jun. 17, 1997.

*Solid Phase Synthesis—Peptides, Proteins and Nucleic Acids; Biological and Biomedical Applications.* Roger Epton, Ed., Mayflower Worldwide Limited, Birmingham, England, UK, 1994.

Früchtel, J. S. and Jung, G., *Agnew. Chem.* 35:17–41 (1996).

Gallop, M. A., et al., *J. Med Chem.* 37:1233 (1994).

Gallop, et al., U.S. Pat. No. 5,525,734, Issued Jun. 11, 1996.

Geysen, et al., International Publication Number WO 90/09395.

Gordon, D. W. and Steele, J., *Bioorg. Med. Chem. Lett.* 5:47 (1995).

Gordon, E. M., et al, *J. Med. Chem.* 37:1385 (1994).

Hobbs DeWitt, S., et al., *Proc. Natl. Acad. Sci. U.S.A.* 90:6909 (1993).

Holmes, C. P., et al., *J. Org. Chem.* 60:7328 (1995).

Holmes, C. P., U.S. Pat. No. 5,549,974, Issued Aug. 27, 1996.

Lloyd-Williams, P., et al., *Tetrahedron* (1993) 49:11065

Maclean, D., et al., *Proc. Natl. Acad. Sci. U.S.A.* 94:2805 (1997).

Moon, H.-S., et al., *J. Org. Chem.* 57:6088 (1992).

Murphy, M. M., et al., *J. Am. Chem. Soc.* 117:7029 (1995).

Patek, M., et al., *Tetrahedron Lett.* 36:2227 (1995).

Patel, D. V., and Gordon, E. M., *Drug Disc. Today* 4:134–144 (1996).

Pei, Y. and Moos, W. H., *Tetrahedron Lett.* 35:5825 (1994).

Plunkett, M. J. and Ellman, J. A., *J. Am. Chem. Soc.* 117:3306 (1995).

Szardenings, A. K., et al., *Tetrahedron* 53:6573 (1997).

Thompson, L. A. and Ellman, J. A., *Chem. Rev.* 96:555–600 (1996).

BACKGROUND OF THE INVENTION

Large collections (libraries) of organic molecules have emerged as important tools for the successful identification of useful compounds. Such libraries have typically been synthesized using combinatorial approaches (see, e.g., Gallop, et al., 1994; Gordon, E. M., et al., 1994). Several different methods have been used to assemble combinatorial libraries of various compounds. One such methodology was disclosed in Geysen, et al. Geysen's method involves functionalizing the termini of polymeric rods and sequentially immersing the termini in solutions of individual amino acids. A second method of peptide or oligonucleotide synthesis was developed by Affymax Technologies N.V. and disclosed in U.S. Pat. No. 5,143,854. The Affymax method involves sequentially using light for illuminating a plurality of polymer sequences on a substrate and delivering reaction fluids to said substrate. This method of synthesis produces large numbers, but relatively small quantities of products. A further method and device for producing peptides or oligonucleotides is disclosed in Houghton, E.P.O. 196174. Houghton's apparatus is a polypropylene mesh container or sac, similar to a tea-bag, which encloses reactive particles.

While combinatorial chemistry synthetic schemes such as the methods described above can generate large numbers of different compounds with a minimum number of steps, they have certain disadvantages. As mentioned above, some of the methods are capable of producing only limited quantities of each compound. Furthermore, the compounds are often synthesized and screened in "pools" or "batches". This can result in loss of potentially valuable information during screening if, for example, a particular pool contains compounds which possess both agonist and antagonist activities. Further, once a pool is identified as containing a potentially active compound, the identity of the active compound must be determined. This identification or decoding requires some type of deconvolution or tagging protocol, requiring additional steps to identify the active compound.

Parallel synthesis strategies do not suffer from the above-mentioned disadvantages of combinatorial approaches, as a single compound is generated and assayed (see, e.g., Sugarman, et al., U.S. Pat. No. 5,503,805, issued Apr. 2, 1996). The disadvantage of parallel synthesis strategies is that presently-available instrumentation for carrying out such syntheses is costly and complex, requiring large number of valves, separate pieces of tubing, and the like. Accordingly, it is generally not suitable for the synthesis of large numbers (e.g., >100) of compounds. Currently available parallel synthesis instruments are typically limited in their capacity to between 12 and 24 reaction vessels for automated instruments and 96 reaction vessels for manual instruments.

Thus, there is a need for simple and efficient systems and methods for synthesizing large numbers of compounds, that do not suffer from the above disadvantages of combinatorial approaches or the complexity and limitations of currently-available parallel synthetic approaches. The present invention provides such systems and methods.

SUMMARY OF THE INVENTION

The invention provides, in one aspect, a system for synthesizing chemicals onto membrane supports in a parallel manner. The system includes a plurality of middle plates and a pair of endplates. Each middle plate has a plurality of holes arranged in a two dimensional array, e.g., square or rectangular array, having x and y axes. The middle plates are stackable on each other and adapted to receive interleaving sheets of membrane to form a three dimensional array of reaction zones having x, y and z axes and defining Z (x,y) reaction planes. In such a three dimensional array, reaction zones having common (x,y) coordinates and different z coordinates form a "column" of reaction zones. The middle plates may be formed of any material that is resistant to the reagents, building blocks and/or solvents which will be circulated through the device. Preferably, the middle plates are formed of a material that is somewhat compliant, so that when the middle plates are clamped together about a membrane, a fluid-tight seal is achieved between adjacent reaction zones in the same (x,y) plane. Exemplary materials suitable for use as middle plates with the present invention include polytetrafluoroethylene (PTFE) or "KALREZ" sheets. The sheets typically have a thickness of between about 0.002" and 0.2"; preferably between about 0.005" and 0.1"; more preferably between about 0.01" and 0.05".

The membranes may be interleaved such that each sheet of membrane is flanked by a set or pair of middle plates, such that a stack of middle plates and membranes would contain, in sequence, a middle plate, membrane, middle plate, middle plate, membrane, middle plate, middle plate, membrane, etc. Further, several sheets of membranes may be interposed in between a single pair of middle plates, thus increasing the surface area available for chemical synthesis of a compound at each reaction zone. The membranes may be formed of, e.g., polypropylene, polyethylene, polytetrafluoroethylene (PTFE) polyacrylate terpolymer, PTFE polyacrylamide terpolymer, or fluoropolymer membrane grafted with styrene, acrylate, or acrylamide.

A pair of end plates is also provided, and the middle plates are positioned between the end plates. The end plates include fluid guides, such as fittings, cylindrical members, channels and/or other plumbing, to selectively route various reagents, chemicals or building blocks through the reaction zones or vessels.

The middle plates are preferably rotatable relative to the end plates to allow the fluid guides to be aligned with selected columns or planes of reaction zones. In one aspect, the fluid lines in one of the end plates are formed into an array of manifolds to allow each manifold to be aligned with one group of reaction zones when the end plate is in a first orientation and to be aligned with another group of reaction zones when the end plate is in a second orientation. Further, each manifold array is preferably connectable to a reagent source, such as a reagent vessel. In one embodiment, the fluid guides are arranged to circulate a reagent or building block through adjacent columns of reaction zones. The fluid guides may further each include a narrowing orifice to control the flow of chemicals through the fluid lines.

The system may further comprise a reagent vessel, a transfer means connecting a subset of the fluid guides with the reagent vessel, and/or a delivery means for delivering fluid from the reagent vessel to the reaction zones, as described in more detail below. In one general embodiment, the system includes a compression means effective to compress the end plates together with sufficient force to isolate reaction zones in each (x,y) reaction plane from one another by a fluid-tight seal. Examples of devices which can be used to compress the middle plates include a pneumatic press, a hydraulic press, a clamp, and a set of bolts.

In another aspect, the invention provides a method of synthesizing a library of compounds. The method includes the steps of (i) providing a pair of middle plates, each middle plate containing a plurality of holes arranged in a two dimensional array having x and y axes when the plates are aligned with one another; (ii) interposing, between the plates, a sheet of membrane capable of serving as a solid support for chemical synthesis; (iii) compressing the plates together to form an array of discrete reaction zones corresponding to the array of holes, where each reaction zone contains a portion of the sheet of membrane, and where the compressing creates a fluid-tight seal between adjacent reaction zones; (iv) delivering a second building block to the reaction zones such that zones having a common x coordinate value receive the same second building block; and (v) delivering a third building block to the reaction zones such that zones having a common y coordinate value are contacted with the same third building block. The reaction of the second and third building blocks in the different reaction zones thus forms the library of compounds. In one general embodiment, the sheet of membrane is pre-derivatized with a first building block, and the library of compounds is formed by the reaction of the first, second and third building blocks in the different reaction zones. The membrane may be any membrane suitable for performing chemical syntheses, as described above.

The middle plates and membranes may be arranged to form a stack, flanked by a pair of end plates, which may include an array of fluid guides corresponding to the array of reaction zones, to allow for selective routing of reagents through the reaction zones. The compressing step may then be accomplished by compressing or clamping the end plates together, for example, with a pneumatic or hydraulic press, or using a clamp or set of bolts.

The invention also provides another exemplary method for preparing a combinatorial library of compounds. According to the method, a plurality of reaction zones is provided. The number of reaction zones is preferably represented as (X×Y×Z), which notation represents the product of X, Y, and Z, where X, Y, and Z represent integers. For example, if X=2, Y=3 and Z=4, (X×Y×Z) would be equal to 24. The reaction zones are preferably arranged in a three dimensional array having x, y and z axes. Accordingly, if the same numbers are used, the array of 24 reaction zones has the dimensions of 2 zones along the x axis, 3 zones along the y axis, and 4 zones along the z axis. The location of each zone in the array is defined by its (x,y,z) coordinates in the array, e.g., a particular zone may have the coordinates (1,3,2). It follows that 2-dimensional planes or arrays of zones may be defined by holding one of the coordinate values constant, e.g., a (y,z) reaction plane of reaction zones is defined by a common x coordinate value. Each of the zones in the array comprises a solid support formed of a portion of a sheet of membrane, and each sheet of membrane provides supports for a plurality of zones which have common z coordinates and which are isolated from one another by fluid-tight seals. In an exemplary embodiment, the solid supports for all zones having a common z coordinate value are contained on a single sheet of membrane (or co-extensive overlapping multiple sheets). The membranes are preferably derivatized with reactive groups as described above.

In preferred embodiments, each solid support has a first building block derivatized thereto, and all zones having a common z coordinate value contain supports with the same first building block. In one embodiment, Z different first building blocks are used, and supports in all zones having a particular z coordinate value are derivatized with a first building block that is different from the first building block attached to supports in zones having different z coordinate values. For instance, the first building block can be a scaffold or portion of a scaffold for a small-molecule library having 3 variable positions or points of diversity. By way of example, in a synthesis where Z=2, the first building block at z=1 is the scaffold with group "A" at one of the points of diversity, and the first building block at z=2 is the scaffold with group "B" at the point of diversity. The other 2 points of diversity on each of the scaffolds may then be derivatized with one of a set of second building blocks, and one of a set of third building blocks, respectively, as described below.

The method further includes contacting a second building block with the support in each of the zones, such that supports in all zones having a common x coordinate value, i.e., all zones in a particular (y,z) plane, are contacted with the same second building block. The contacting is done under chemical synthesis conditions effective to form an intermediate product containing the first and second building blocks (or those portions of the first and second building blocks that remain following the chemical reaction used to link the building blocks to one another). Such chemical synthesis conditions are known in the art of solid-phase chemical synthesis. In one embodiment, X different second building blocks are used, and supports in all zones having a particular x coordinate value are contacted with a second building block that is different from the second building blocks contacted with supports in zones having different x coordinate values. This second building block may be, for example, a group designated for attachment to another variable position or point of diversity on the scaffold described above. The X different second building blocks are typically stored in X different reagent vessels, respectively, and are introduced to the zones through manifolds, typically X different manifolds, operably connected to the X reagent vessels, respectively.

A third building block is then contacted with the support in each of the zones, such that supports in all zones having a common y coordinate value are contacted with the same third building block. As above, the third building block is contacted under conditions effective to form a compound from the intermediate product and the third building block. The third building block may be introduced as described above for the second building blocks, e.g., using Y different third building blocks, Y different reagent vessels, manifolds and the like. Carrying out the above-described steps thus results in the synthesis of a combinatorial library of compounds.

The method may be practiced using an array of manifolds. The manifolds are preferably (i) aligned with zones having a common x coordinate value when the manifolds are in a first orientation, and (ii) aligned with zones having a common y coordinate value when the manifolds are in a second orientation. To move the array from one orientation to the other, the array is typically rotated by 90 degrees relative to the reaction zones, so that if the manifolds had been aligned with (y,z) planes in the first orientation, they would be aligned with (x,z) planes in the second orientation.

To allow for convenient introduction of reagents to the reaction zones, the 3-dimensional array of reaction zones is preferably flanked along the z axis by a pair of end plates, each of which includes plumbing designed to allow the building blocks to flow through the reaction zones. In one embodiment, the plumbing comprises channels in the plates effective to (i) circulate the same first building block through each zone having a common x coordinate value when the end plates are in a first orientation, and (ii) circulate the same second building block through each zone having a common y coordinate value when the end plates are in a second orientation. Each end plate may in turn be formed of more than one component, e.g., a clamping plate and a manifold plate. Efficient circulation of reagents, building blocks and the like may be enhanced by piercing holes in, or perforating the membranes in the reaction zones. Perforating the membranes reduces the pressure required to circulate reagents through a column of reaction zones, particularly in cases where several layers of membrane comprise the solid support in a single reaction zone.

The reaction zones in the simplest case are simply those portions of the membrane exposed to the various reagents/building blocks. It will be understood that to increase product yield, a region of each of several sheets of membrane corresponding to each reaction zone. Different zones in a single (x,y) plane are isolated from one another by a fluid-tight seal. As is appreciated from the foregoing discussion, such a seal may be formed, for example, by including one or more middle plates in the 3-dimensional array of reaction zones to separate sheets of membrane containing planes of reaction zones having a common z coordinate value. The middle plate contains an array of holes spaced to correspond to the spacing of the reaction zones, and the seal is achieved by applying pressure to the endplates, thereby compressing the membranes between the endplates and any middle plates. The reaction zones in such a configuration are defined by the portions of membrane aligned with the holes of the middle plate. The compression force applied by the end and middle plates on regions of membrane outside the reaction zones effectively seals those regions, thereby separating adjacent reaction zones in a single membrane sheet by fluid-tight seals.

Sealing may be facilitated by using middle plates having ridges ("force directors") surrounding the holes on at least one side, to direct the compression force to a ring around each reaction zone. Alternatively or in addition, sealing may be enhanced by treating the membrane before it is used in an apparatus or methods of the invention. For example, the membrane may be treated by compressing it under high pressure, optionally at elevated temperatures, in a ring pattern around the regions that will become the reaction zones. Such compression can be used to compact the membrane such that it no longer has pores in the region of compression, and thus loses its ability to wick liquids in that region.

The invention also includes a system for synthesizing a combinatorial library of compounds. The system comprises (X×Y×Z) reaction zones arranged in a three dimensional array having x, y and z axes and forming X (y,z), Y (x,z) and Z (x,y) reaction planes. The location of each zone in the array is defined by its (x,y,z) coordinates, each of the zones comprises a solid support formed of a portion of a sheet of membrane, each sheet of membrane provides supports for a plurality of zones which have common z coordinates and which are isolated from one another by fluid-tight seals, and reaction zones having common (x,y) coordinates are in fluid communication with one another. In one general embodiment, each solid support or portion of membrane has a first building block derivatized thereto.

The system further includes at least one reagent source, such as a reagent vessel; a transfer means connecting the reaction zones with the reagent source; and a delivery means for delivering fluid from the reagent source to the reaction zones by way of the transfer means. The reagent vessel may in turn include additional elements, such as a condenser, a plurality of feed lines for delivering reagents to the reagent vessel, a heater, a temperature sensor, and the like.

In one embodiment, the delivery means comprises a pump, such as a peristaltic, diaphragm, metering or syringe pump. Alternatively, the delivery means may comprise pressurized gas introduced into one of a pair of reagent vessels, as described with reference to FIG. 15, below.

In a preferred embodiment, the system employs a closed loop for reagent/building block delivery, so that reagents and building blocks can be circulated or recirculated through the reaction zones. In a preferred embodiment, the reagent source comprises a number of reagent vessels (or pairs of reagent vessels) that is equal to X or Y, whichever is greater.

As discussed above, the system may further comprise a plurality of manifolds, each of which is selectively alignable with one of the (x,z) or (y,z) planes of reaction zones, to allow building blocks from a single reagent source to pass through a selected one of the planes of reaction zones. The manifolds may be fashioned into a 2-dimensional array which is rotatable relative to the 3-dimensional array of reaction zones to align each manifold with either (x,z) reaction zone planes or (y,z) reaction zone planes. Each manifold is preferably linked to its own reagent source. Further, the number of manifolds in the array is typically equal to or greater than X or Y, whichever is greater. In this way, the manifold array can be used to deliver reagents to all X (y,z) reaction planes, as well as to all Y (x,z) reaction planes. For example, if X=8 and Y=12, the number of manifolds would preferably be 12 or more.

In a related embodiment, the system further comprises a pair of end plates flanking the three dimensional array of reaction zones along the z axis, wherein the end plates each include plumbing to circulate the chemicals through each (x,z) plane/array or each (y,z) plane/array of reaction zones. Further, the end plates may be rotatable relative to the reaction zones to align the plumbing with selected (x,z) or (y,z) planes of reaction zones. In one embodiment, the plumbing comprises channels in the plates to circulate the same building block through reaction zones having a common x coordinate value when the end plates are in a first orientation, and to circulate the same building block through zones having a common y coordinate value when the end plates are in a second orientation.

These and other objects and features of the invention will become more fully apparent when the following detailed description is read in conjunction with the accompanying drawings.

DETAILED DESCRIPTION OF THE SPECIFIC EMBODIMENTS

I Definitions

The term "building blocks" refers to the chemical components which are introduced sequentially in a step-by-step manner to generate a desired product or compound. Small molecule compounds suitable for screening for pharmacological activity can typically be synthesized using between 2 and 5 building blocks. To generate a combinatorial library of such compounds, the building blocks are introduced in "sets", where the number of sets is equal to the number of building blocks required to make a final compound. Therefore, to synthesize a combinatorial library of compounds where each compound is synthesized using 3 different building blocks, the methods uses 3 sets of building blocks. The building blocks within each set typically belong to the same "chemical family", so that they will react with building blocks in the other sets in a predictable manner (Gordon, et al., 1994). The building blocks may be selected to react in a polymeric fashion to form a linear molecule having a structure specified by the identity of the building block at each position. Alternatively, the building blocks may be selected to react in an interlocking manner, giving rise to non-polymeric three-dimensional structures (Gordon, et al., 1994, incorporated herein by reference). The present invention preferably employs 2 or 3 sets of building blocks during a synthesis of a library of compounds.

The term "reaction zone" refers to a volume which is adapted to contain a solid support, such as a membrane, and a reagent solution for reacting with the solid support II Overview of the Invention The invention provides systems and methods for synthesizing chemical compounds by sequential addition of chemical building blocks onto solid supports in a parallel manner to produce a combinatorial collection of compounds. The solid supports are in "reaction zones", with a single compound synthesized in each reaction zone. The number of different compounds which can be synthesized is thus equal to the number of reaction zones. The reaction zones are typically arranged in a 3-dimensional array, and are preferably maintained at fixed positions relative to one another during synthesis. An important feature of the invention is that the identity of a compound in a particular reaction zone is determined simply from the relative location of that reaction zone in the array. In this way, the need to encode the individual supports is eliminated.

Figure 1:
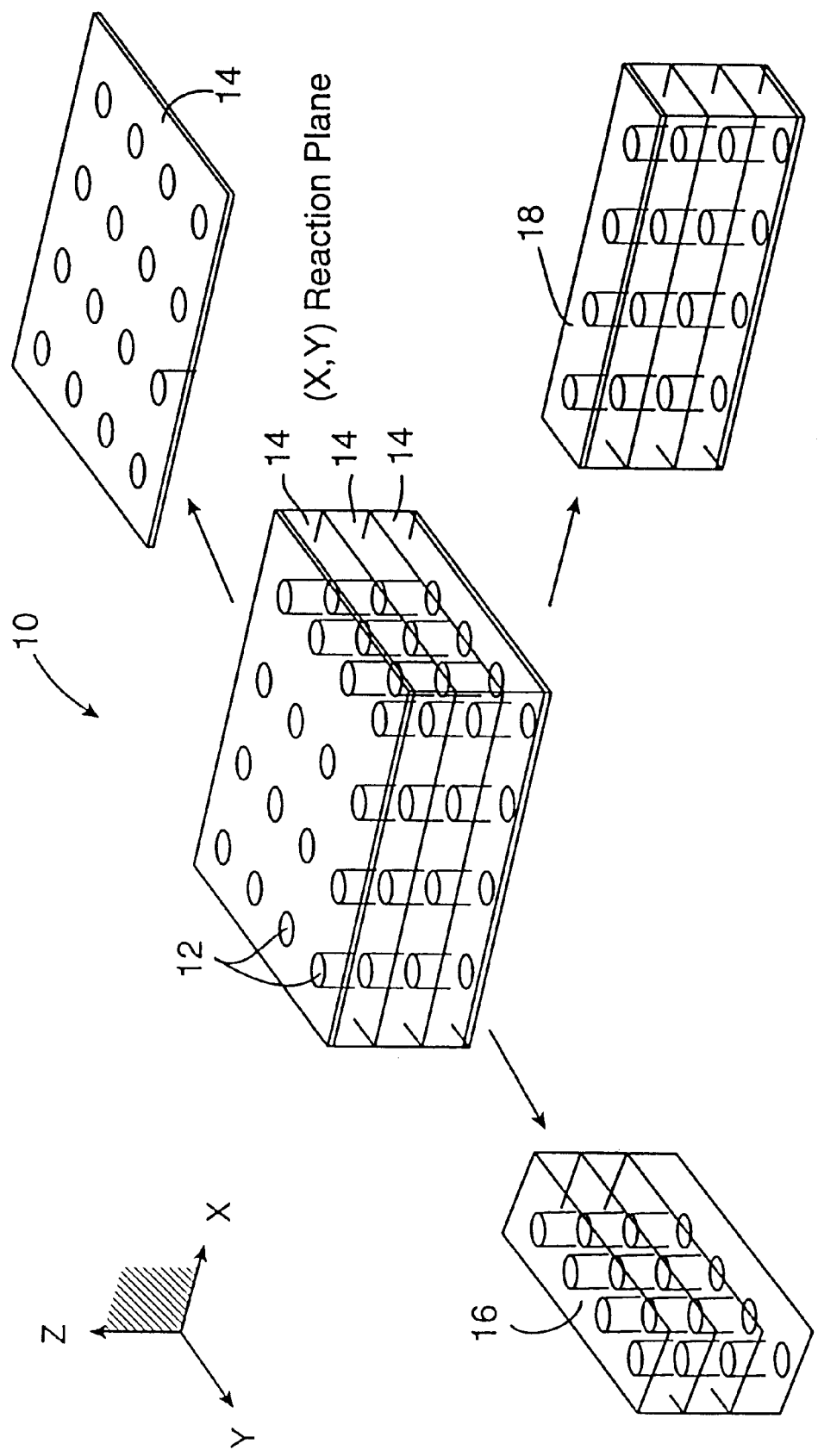
FIG. 1 is a schematic illustration of the (x,y,z) coordinate system of a 3-dimensional array of reaction zones, showing (x,y), (x,z), and (y,z) reaction vessel planes.

Referring now to FIG. 1, a schematic diagram of a reaction zone assembly 10 will be described. Reaction zone assembly 10 includes a three-dimensional (4×4×4) array of reaction zones 12. However, it will be appreciated that such a number of reaction zones are set forth merely for purposes of illustration, and any number of reaction zones which are arranged in a three dimensional array may be used according to the principles of the present invention. For convenience of discussion, reaction zone assembly 10 may be provided with an x,y,z coordinate system, and may be described in terms of two-dimensional arrays or "reaction planes" of reaction zones. Using such a coordinate system, reaction zone assembly 10 may be divided into four horizontal (x,y) reaction planes 14, each of which includes a two dimensional array of 16 reaction zones. In a similar manner, reaction zone assembly 10 may be divided into four vertical (y,z) reaction planes 16 and four vertical (x,z) reaction planes 18. Each of reaction planes 16 and 18 also includes a two dimensional array of 16 reaction zones. Further, it will be appreciated that reactions zones 12 in planes 16 and 18 are arranged in 4 columns of 4 reaction zones per column. Each column contains reaction zones having common (x,y) but different z coordinates.

The use of a three dimensional array of reaction zones allows a different combination of chemical reagents or building blocks to be contacted or reacted with the supports in each (x,z) and (y,z) reaction plane. If the reaction zones in each (x,y) plane are pre-derivatized with a different first building block, the resulting library will have a number of combinatorial compounds which is equal in number to the number of reaction zones. For example, since reaction zone assembly 10 of FIG. 1 includes a 4×4×4 array of reaction zones, the maximum number of chemical compounds that may be produced is $4^3$ or 64. Moreover, as previously described, the particular compound or chemical combination synthesized onto a specific support will be known based upon the location of the reaction zone which contained the support.

One exemplary method for producing such a combinatorial collection of compounds using reaction zone assembly 10 will next be described. For convenience of discussion, the method described is one where the maximum number of combinatorial compounds is produced (i.e., a number equal to the number of reaction zones). However, it will be appreciated that fewer compounds may be produced simply by duplicating one or more of the chemicals or building blocks that are introduced into the reaction zone planes.

In the method, each of the reaction planes is provided during synthesis with a different building block to produce $4^3$ chemical combinations. Each reaction zone contains a solid support, which is preferably pre-derivatized with one of four different first building blocks. The four different first building blocks are typically distributed such that all reaction zones in the top (x,y) reaction plane 14 contain supports prederivatized with the same first building block. Similarly, the (x,y) reaction plane disposed below the top (x,y) reaction plane is uniformly provided with a different first building block, and so on. In this way, reaction zone assembly 10 will initially be provided with supports having four different chemical building blocks derivatized thereto.

A second chemical building block is then introduced into the reaction zones of each of the (y,z) reaction planes, such that supports in all zones having a common x coordinate value are contacted with the same second building block. The second building block is typically added under conditions which result in the formation of an intermediate product synthesized from the first building block and the second building block. In the final step, a third building block is introduced into the reaction zones of each of the (y,z) reaction planes, such that supports in all zones having a common y coordinate value (i.e., (y,z) planes) are contacted with the same third building block. As above, the third building block is typically added under conditions which result in the synthesis of the final compound formed from the first building block, the second building block, and the third building block. If different building blocks are used in the different reaction planes as described above, the method results in the synthesis of a different compound in each of the reaction zones.

Of course, some of the chemicals may be duplicated so that the total number of chemical combinations will be less than the number of reaction zones. Further, it will be appreciated that each support may receive more or less than three building blocks to produce other kinds of combinatorial libraries.

III Exemplary Systems

Figure 2:
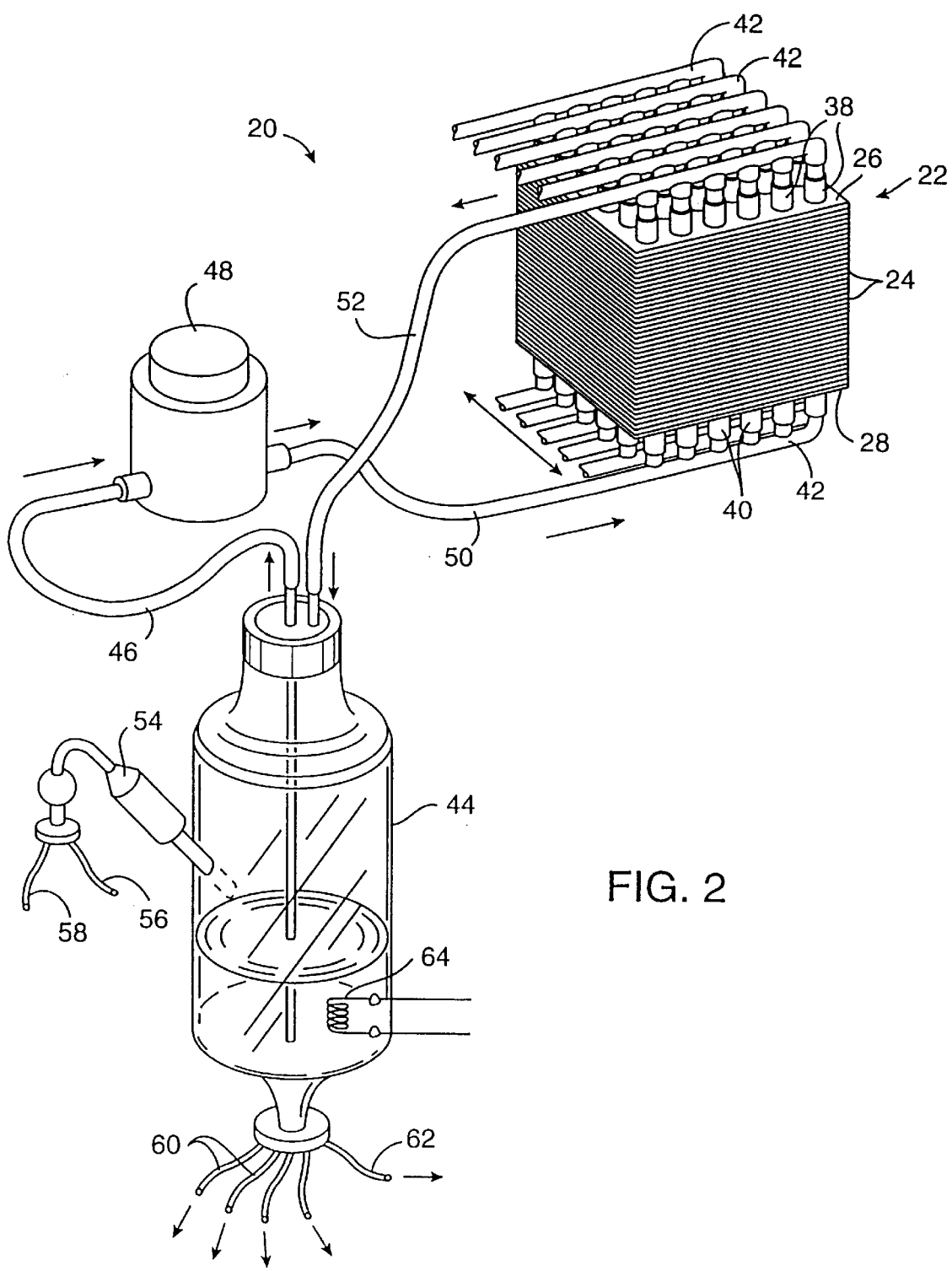
FIG. 2 is a perspective view of an exemplary system or apparatus for producing a combinatorial collection of compounds according to the invention.

Referring now to FIG. 2, a system 20 for addition of chemical reagents or building blocks onto supports to produce a combinatorial collection of compounds will be described. System 20 comprises a reaction vessel assembly 22 having a plurality of stackable middle plates 24 and a pair of end plates 26 and 28.

Figure 3:
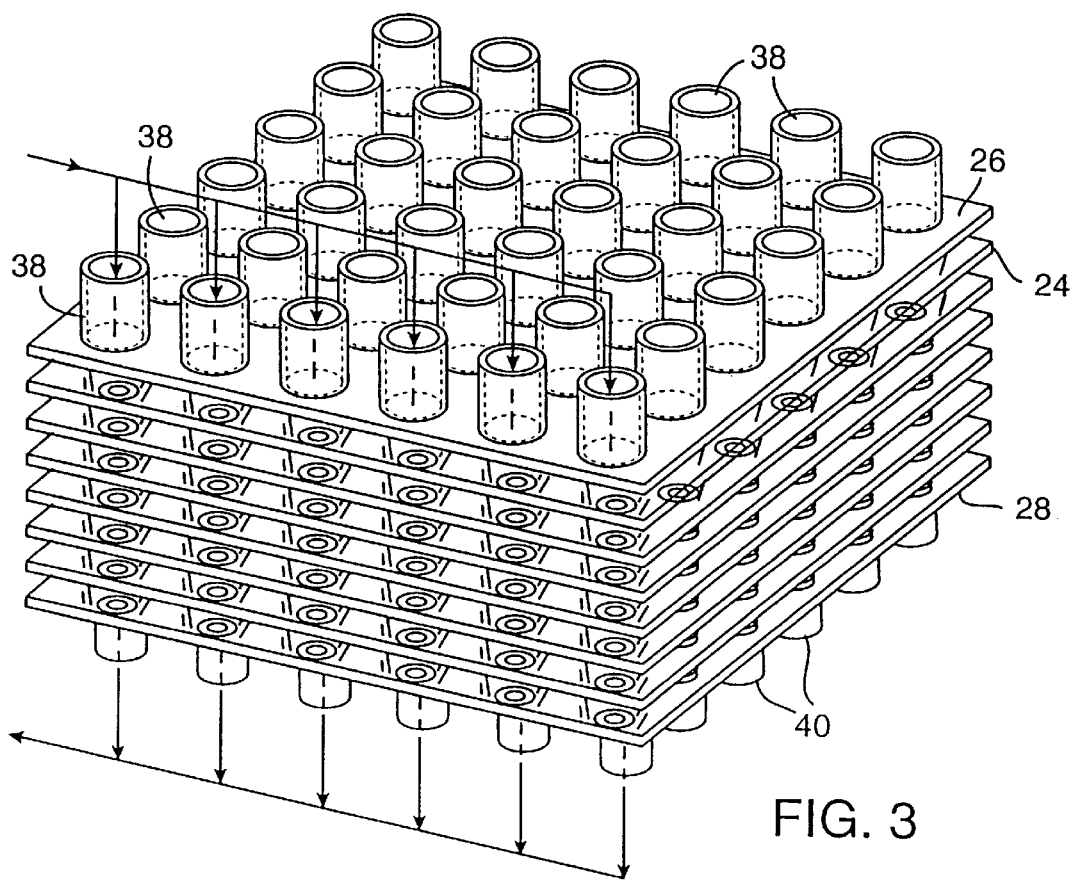
FIG. 3 is a perspective view of a reaction vessel assembly for the system of FIG. 2.
Figure 4:
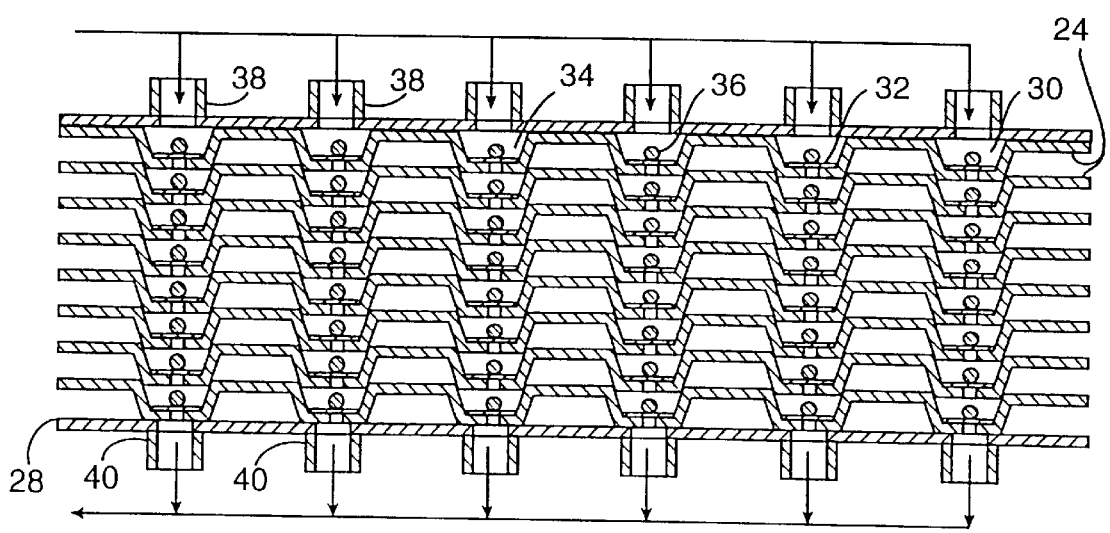
FIG. 4 is a cross-sectional side view of the reaction vessel assembly of FIG. 3.

As best illustrated in FIGS. 3 and 4, middle plates 24 each comprise a two dimensional array of wells or reaction vessels 30. By stacking middle plates 24 on top of each other, a three dimensional array of reaction vessels is created. Each of reaction vessels 30 includes an open top end and a hole 32 in a bottom end. In this way, chemicals may be circulated through a column of reaction vessels 30 as described in greater detail hereinafter. At the bottom end of reaction vessels 30 is a frit 34 covering hole 32. Resting upon frit 34 is one or more solid supports 36. Frits 34 hold the solid supports 36 within reaction vessels 30 as reagents, chemicals or building blocks are circulated through the reaction vessels. As discussed below, a seal (not shown) may be incorporated between the plates to prevent cross-contamination between the reaction vessels.

End plates 26 and 28 each include a plurality of fluid guides, here comprising cylindrical members 38 and 40, respectively, which are aligned with reaction vessels 30 when end plates 26 and 28 are aligned with middle plates 24. Referring back to FIG. 2, system 20 includes a plurality of manifolds 42 which are insertable into rows of cylindrical members 38 and 40. In particular, each row of cylindrical members 38 and 40 has its own manifold 42. Further, the manifolds which are attached to end plate 28 are in communication with a reagent source 44, such as a reagent vessel (only one being shown for convenience of illustration) so that a chemical reagent or building block may be circulated through the vertical columns of reaction vessels 30 which are aligned with manifold 42. The chemicals within different reagent sources 44 may all be different from each other or, alternatively, some of the chemicals may be the same.

Reagent source 44 delivers its chemical to manifold 42 through a tube 46 which in turn is connected to a delivery means, such as pump 48. Pump 48 pumps the chemicals from source 44, through tube 46, and into a tube 50 where it flows into manifold 42. Tubes 46 and 50 thus comprise a means to transfer reagents, chemicals or building blocks between the reagent source and the reaction zones. The tubes can be made from any material (e.g., PTFE) that is resistant to the reagents used with the system. Suitable PTFE tubing can be purchased from, e.g., Micro Biomedical Tubing (Cassville, Ga.), The Furon Co. (Fremont, Calif.), or David Schnur Associates (Los Altos, Calif.). After circulating through the vertical columns of reaction vessels 30 which are aligned with the manifold in end plate 28, the chemical enters into manifold 42 in end plate 26 and into a tube 52 where it is circulated back into reagent source 44. In this way, a particular building block may be continuously circulated through a two dimensional array or reaction plane of reaction vessels 30 for a selected period of time so that that step of the synthesis can proceed to the desired degree of completion. Of course, it will be appreciated that for certain types of reactions, recirculation of the reagents through the reaction zones may not be required. In such applications, the reagent is introduced into the reaction zones for a selected period of time, and is then drained via tube 52 into either reagent source 44 or into a waste container. Alternatively, reagents or building blocks may be introduced through top end plate 26, rather than bottom end plate 28. Further, reaction zone assembly may be heated, cooled, agitated, vortexed or vibrated to maintain solid supports 36 in suspension at a desired temperature during the synthesis.

Conveniently, reagent source 44 may include a condenser 54 having a vent 56 and a gas line 58 to regulate the pressure within the system. Condenser 54 is typically maintained at a cooler temperature than the reagent in reagent source 44, in order to condense reagent vapors and allow the condensed reagent to drip back into reagent source 44. Gas line 58 is preferably connected to a source of inert gas (not shown), such as argon or nitrogen. A plurality of tubes 60 are provided to introduce various constituents into reagent source 44, and a waste tube 62 is provided to allow chemicals to be drained from reagent source 44.

A heater 64 may optionally be provided to regulate the temperature of the reagent within reagent source 44. In this way, the chemical reactions in the reaction zones may be conducted at selected elevated temperatures. Reagent source 44 may also be cooled, e.g., using a Peltier device, by immersion in a dry ice bath, or by other methods know in the art.

Pump 48 may be selected from a variety of commercially-available pumps, including peristaltic pumps, metering pumps, diaphragm pumps, syringe pumps and the like. Suitable pumps can be purchased from any of a variety of suppliers, e.g., Cole-Parmer Instrument Company (Vernon Hills, Ill.), Cavro Scientific Instruments Inc. (Sunnyvale, Calif.), and Advanced Flow Systems, Pump Express Div. (Elk Grove Village, Ill.). Like other components in the system, pumps are selected so that those parts of the pump that come in contact with the solutions and reagents used with the synthesizer are resistant to such solutions and reagents. Further, the pumps are preferably selected to be operable with solutions having temperatures in the range of temperatures which will be used during various synthesis steps. Preferably, the pumps are able to operate with solution temperatures between about −80° C. and about +100° C. Exemplary pumps having such characteristics include syringe pumps.

Figure 5:
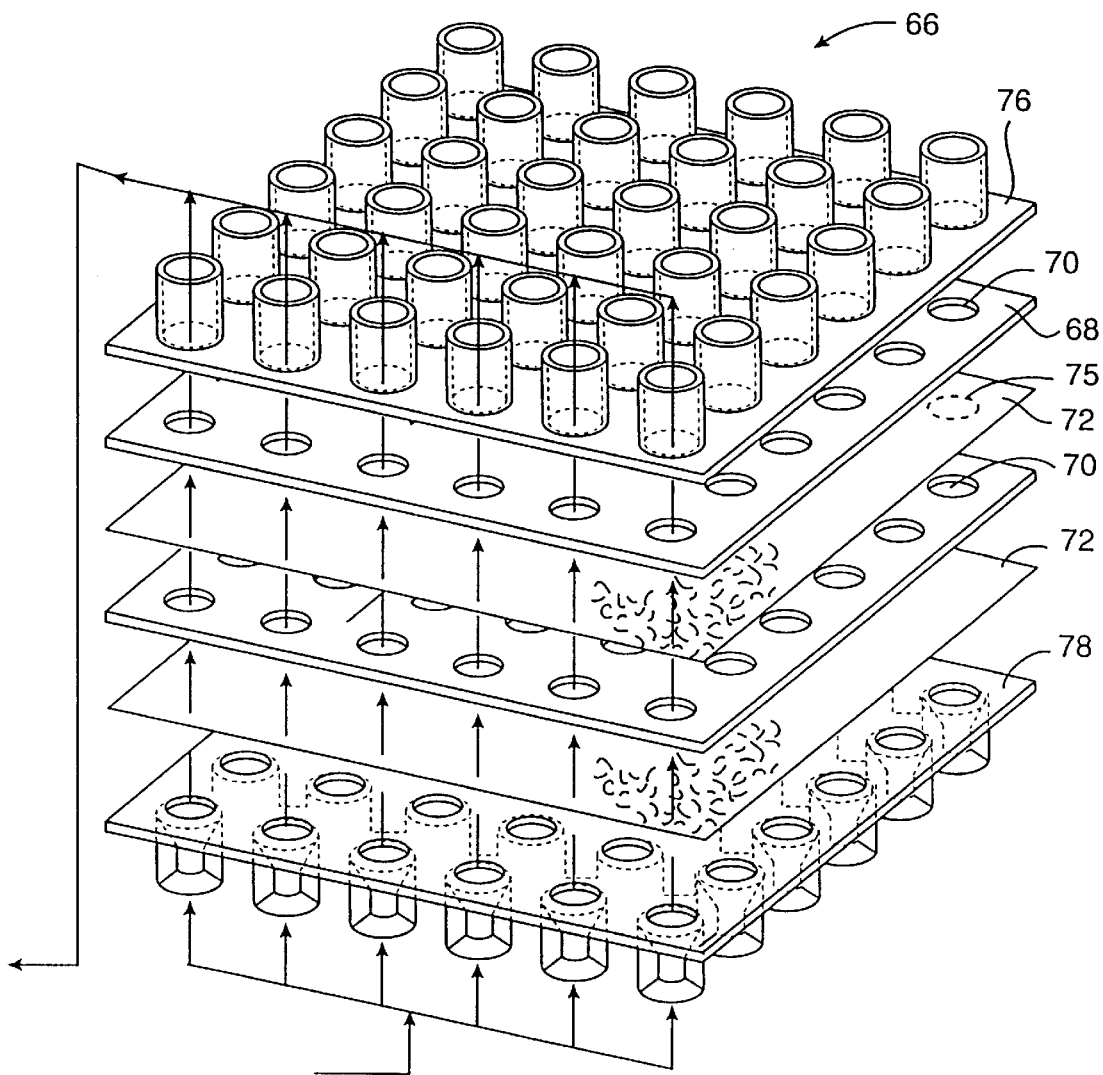
FIG. 5 is an exploded perspective view of a preferred embodiment of a reaction zone assembly for the system of FIG. 2.
Figure 6:
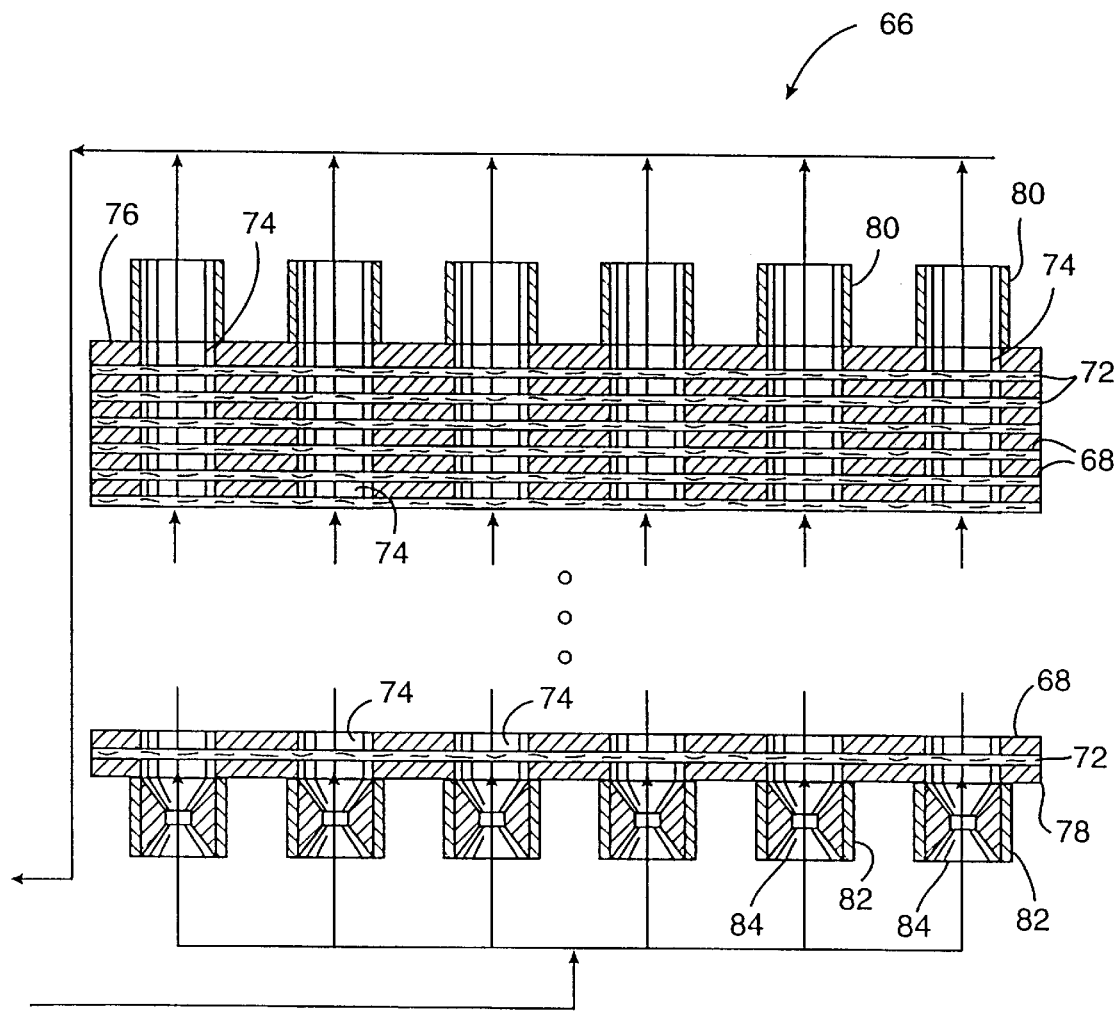
FIG. 6 is a cross-sectional side view of the reaction zone assembly of FIG. 5.

Referring now to FIGS. 5 and 6, a preferred embodiment of a reaction zone assembly 66 will be described. Reaction zone assembly 66 is configured such that it may be used as an alternative to reaction vessel assembly 22 of FIG. 2. Reaction zone assembly 66 comprises a plurality of middle plates 68 which each include a two dimensional array of circular holes or apertures 70. Disposed beneath each middle plate 68 is a membrane 72 so that when middle plates 68 are clamped or compressed together as shown in FIG. 6, a three dimensional array of reaction zones 74 is formed.

One particular feature of reaction zone assembly 66 is that the solid support in each zone is a region 75 of one or more membranes 72. Membranes 72 typically contain an initial set of chemical building blocks thereon, at least on regions 75 corresponding to reaction zones 74. In preferred embodiments, all reaction zones on one sheet of membrane 72 will contain the same initial chemical, and different sheets, used to provide substrates in different (x,y) reaction planes, will be derivatized with different initial chemicals. The membrane may be pierced (e.g., with a needle) in one of more places per reaction zone, to facilitate flow of solutions through the membranes and/or to decrease the pressure required to circulate building blocks or reagents through the block assembly.

Suitable membranes for these applications include polypropylene membranes, polyethylene membranes, PTFE polyacrylate terpolymer membranes, PTFE polyacrylamide terpolymer membranes, and fluoropolymer membranes grafted with styrene, acrylate, acrylamide and the like. Exemplary membranes, containing an "OH" group suitable for derivatization, include "LCR", a PTFE polyacrylate terpolymer membrane, and "DURAPORE", a PVDF (polyvinylidene fluoride) polyacrylate terpolymer membrane, both available from Millipore Corp.(Bedford, Mass.). Such membranes may be derivatized using standard solid-phase chemistries, e.g., as described by Daniels, et al., (1990). Other suitable membranes include "EMPORE" membranes available from 3M Corporation (St. Paul, Minn.). The "EMPORE" membranes contain resin beads entrapped in a mesh of PTFE fibers. Alternatively or in addition, a multi-component membrane suitable for use with the invention may be formed by trapping a layer of resin between two sheets of membrane (e.g., PTFE membrane) and fusing the resulting membrane "sandwich", e.g., by pressure and/or heating, in regions outside the reaction zones, forming an array of unfused "pockets" of resin spaced to correspond to reaction zones. Such a multi-component membrane affords an increased surface area of solid support available for reaction at each reaction zone, while preserving the advantages of synthesizing different compounds on a single sheet of membrane as detailed herein.

Reaction zone assembly 66 further includes a pair of end plates 76 and 78. End plate 76 is similar to end plate 26 of reaction vessel assembly 22 and includes a plurality of cylindrical members 80 for receiving a manifold as previously described in connection with FIG. 2. End plate 78 includes a plurality of cylindrical members 82 which are each provided with a restrictive orifice 84 to regulate the flow of chemicals through cylindrical members 82. When circulating the chemicals through reaction zone 74, one or more of the reaction vessels may become partially occluded, thereby reducing the flow of chemicals through a particular vertical column of reaction vessels. In turn, an increased volume of chemicals would be diverted into the other reaction vessels. By restricting the flow of chemicals using orifice 84, a mechanism is provided to limit the amount of increased flow through the remaining reaction vessels. In this way, excessive flows will be prevented in the non-blocked reaction vessels, thereby insuring a predetermined volume of reagents through all columns. End plates 76 and 78 are rotatable relative to middle plates 68 so that chemicals may be circulated through reaction vessels 74 in a manner similar to that previously described in connection with system 20 of FIG. 2.

Figure 7:
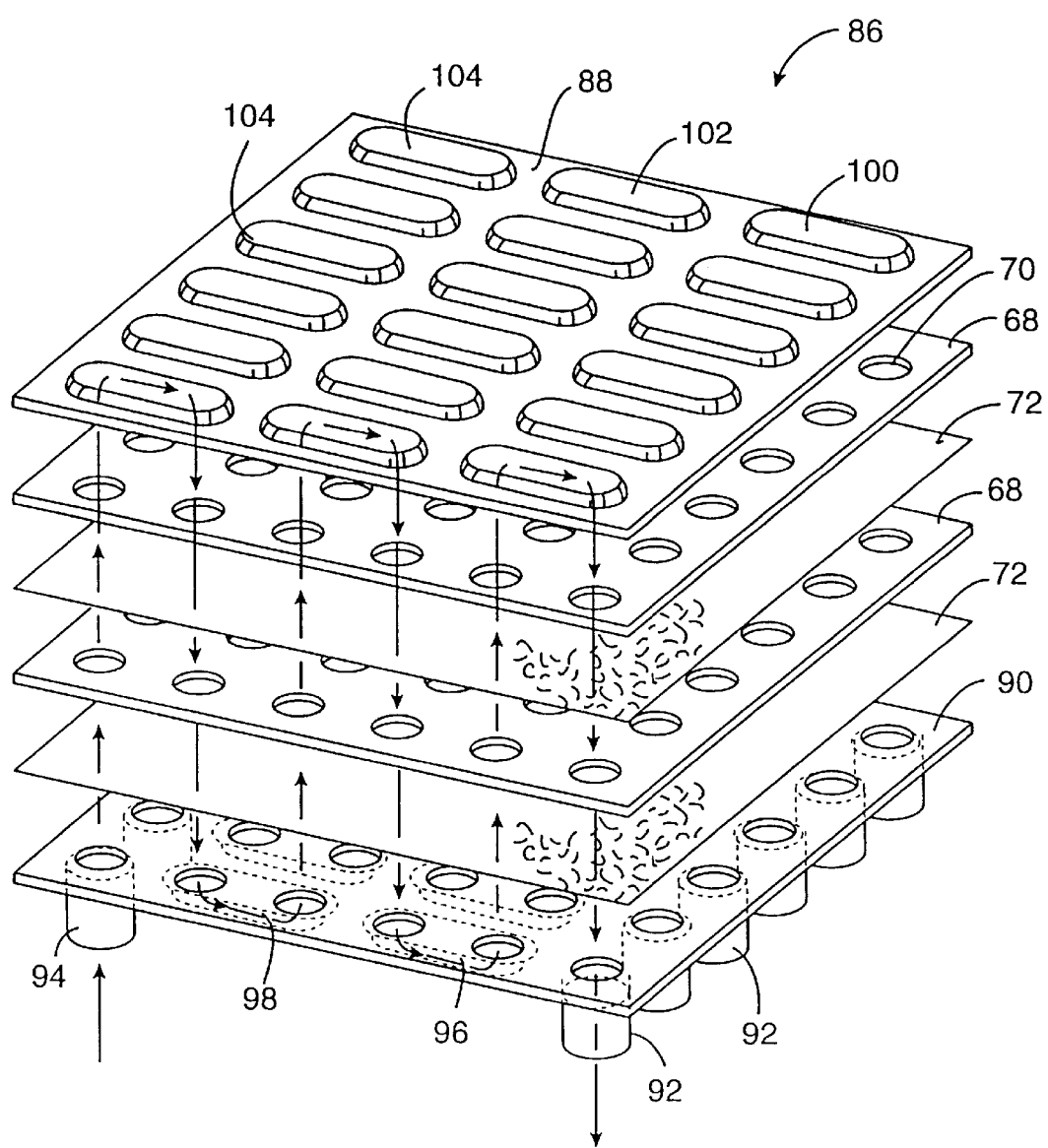
FIG. 7 is a perspective view of yet another embodiment of a reaction zone assembly according to the invention.
Figure 8:
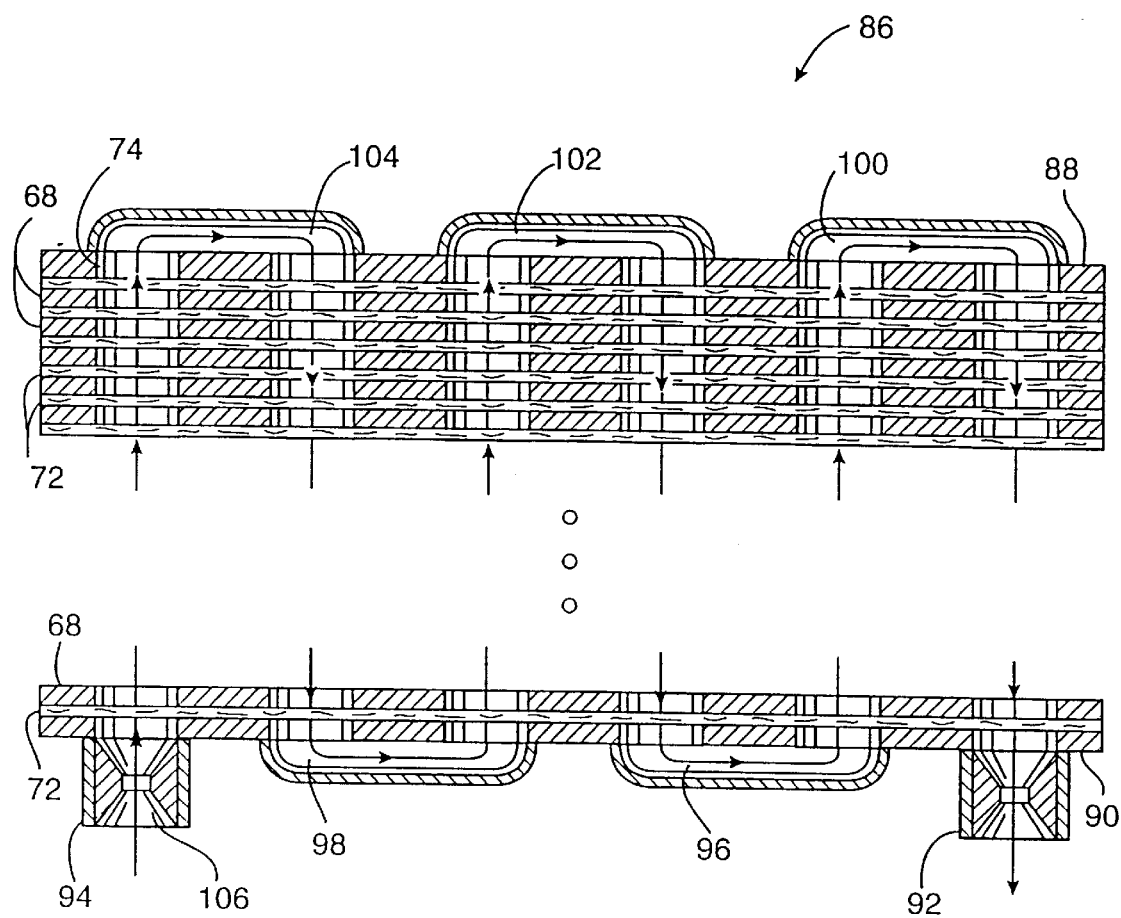
FIG. 8 is a cross-sectional side view of the reaction zone assembly of FIG. 7.
Figure 9:
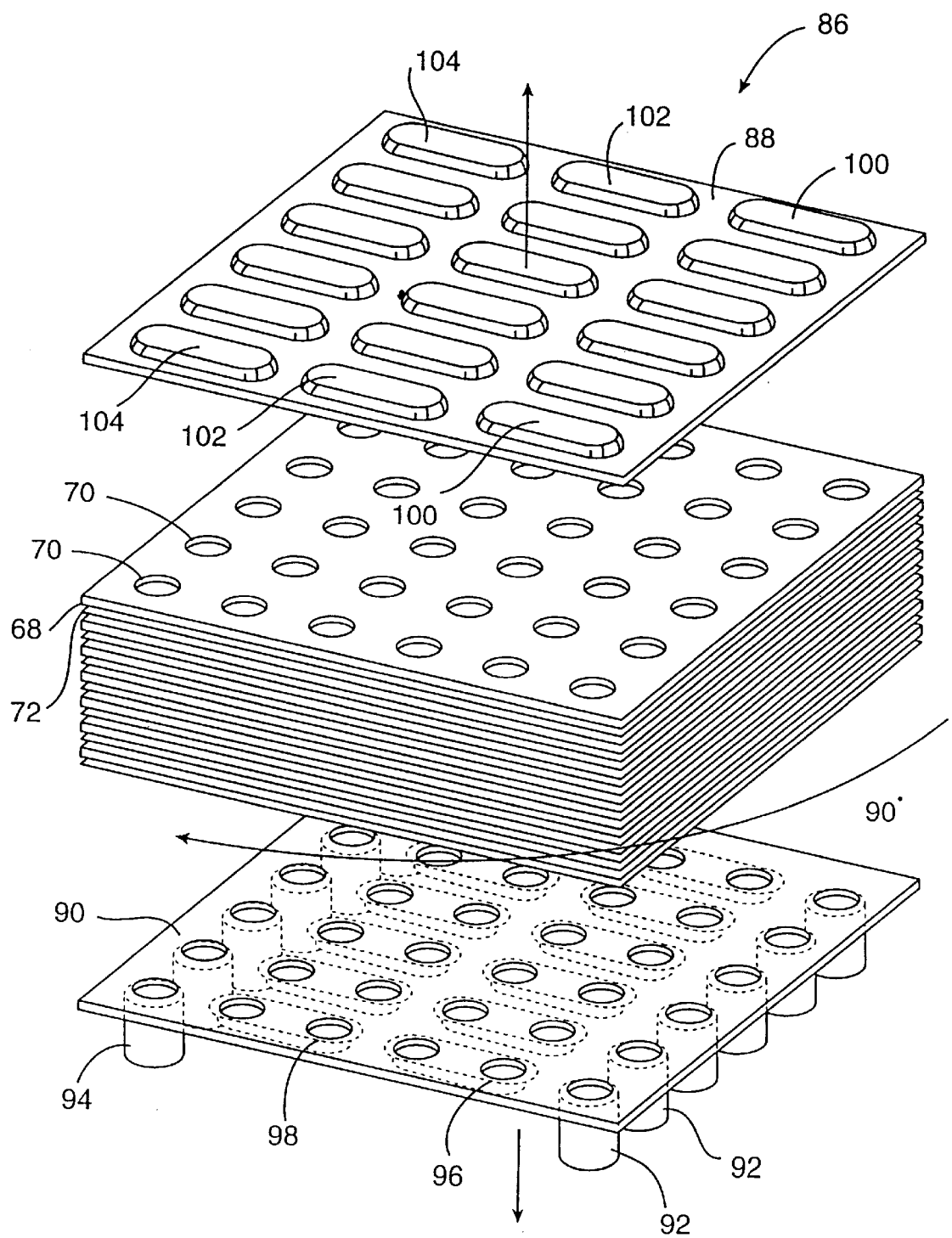
FIG. 9 illustrates the reaction zone assembly of FIG. 7, showing the rotation of a set of middle plates and membranes defining reaction zones relative to a pair of end plates having channels for circulating reagents through the reaction zones according to the invention.

Referring now to FIGS. 7–9, yet another alternative embodiment of a reaction zone assembly 86 will be described. Reaction zone assembly 86 may be used with system 20 of FIG. 2 and does not require the use of a set of manifolds. Reaction zone assembly 86 comprises a plurality of middle plates and membranes which are essentially identical to those described in connection with reaction zone assembly 66. For convenience of discussion, the same reference numerals used in connection with reaction zone assembly 66 will be used for similar elements in reaction zone assembly 86.

Reaction zone assembly 86 further includes a pair of end plates 88 and 90. End plate 90 includes two rows of cylindrical members 92 and 94 and two rows of channels 96 and 98, which serve as fluid guides in the end plates. End plate 88 includes three rows of channels 100, 102 and 104. As best illustrated in FIGS. 7 and 8, such a configuration of fluid guides allows a chemical from the reagent source to be introduced into cylindrical member 94 where it will pass through a vertical column of reaction vessels 74 and into channel 104. Channel 104 directs the chemical through an adjacent vertical column of reaction vessels 74 until the chemical passes through channel 98. Continuing on, the chemical then passes through channel 102, channel 96 and channel 100 until finally exiting through cylindrical member 92. In this way, the need for a pair of manifolds to circulate the fluids through the reaction vessels is eliminated. Instead, the reagent source may be directly connected to cylindrical member 94, and a return line may be placed between cylindrical member 92 and the reagent source. As illustrated in FIG. 8, cylindrical member 94 may be provided with a restrictive orifice 106 to restrict the flow of chemicals through the reaction vessels in a manner similar to that previously described.

As illustrated in FIG. 9, end plates 88 and 90 are rotatable relative to middle plates 68. In this way, the middle plates may be rotated 90° to realign channels 96–104 with an orthogonal set of reaction vessel so that another building block may be added to the supports in a manner similar to that previously described.

Figure 10:
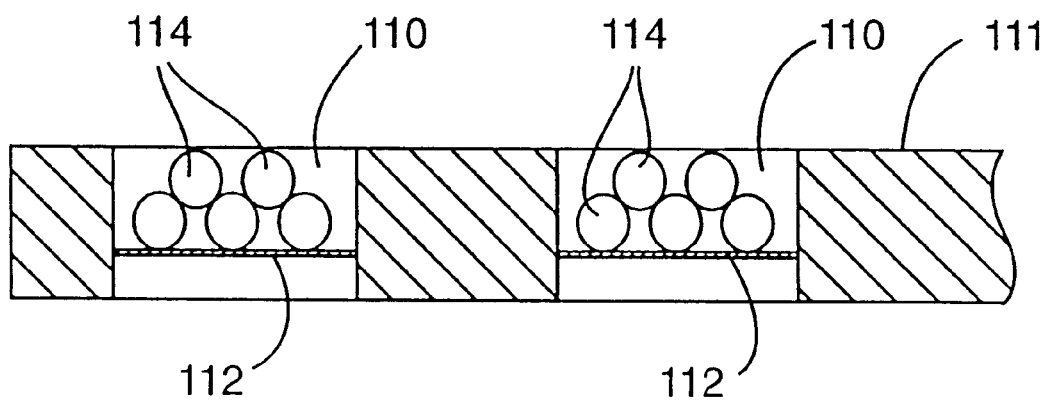
FIG. 10 is a cross-sectional side view of a middle plate having a plurality of dividers, where the void above each divider defines the lower portion of one reaction zone, and the void below each divider defines the upper portion of a different reaction zone, the zones being formed by the apposition of two or more such plates.

In embodiments utilizing reaction vessels, as opposed to reaction zones on a membrane, it may be desirable to place a plurality of beads into the reaction vessels. One convenient way to load the reaction vessels would be to cover the entire plate with beads and scrape off the excess, thereby completely filling each reaction vessel with the beads. A problem with this approach, however, is that the beads tend to swell when exposed to the solvents used during the chemical synthesis. Since the reaction vessels would be completely filled with dry beads, there would be no room to allow for swelling. This problem can be overcome by using the approach illustrated in FIG. 10. Each well 110 in middle plate 111 is provided with a divider 112, such as a frit or a membrane, so that only a portion of well 110 is provided with beads 114. A plurality of middle plates are then stacked on top of one another as previously described, such that each reaction zone is formed of two halves—the bottom half including well 110 filled with beads, and the top half including the portion of well 110 in an overlying middle plate below divider 112. In this way, when the beads expand, there will be sufficient area within each reaction zone or vessel to accommodate the expansion.

The dimensions of the reaction zones described herein will differ depending upon a variety of factors including the number of reaction zones, the types of chemicals employed, desired products, amount/yield of products and the like. To maximize efficiency and minimize the amount of reagents and building blocks required, the total volume in systems which recirculate the building blocks or chemicals through the reaction zones is preferably kept to the minimum required for efficient synthesis. The volumes required may be determined using standard calculations. For example, if each reaction zone has a diameter of about 0.7 cm (so that an array of such reaction zones can be conveniently arranged at the 0.9 cm spacing corresponding to a standard 96-well plate), and a height of ~0.076 cm (the height of two 0.015" thick PTFE middle plate sheets flanking the membrane on which synthesis occurs), the resulting volume per reaction zone is about 30 $\mu$l. An (x,y) reaction plane in a $12^3$ reaction vessel assembly would thus have a reagent volume of ~4.3 ml. The amount of compound which can be synthesized per unit area of membrane can be readily determined based on the surface density of derivatizable groups on the membrane (termed "membrane load"), a value which may be obtained from the manufacturer of the membrane or determined experimentally. Typically, this number is between about 0.04 and 4.0 $\mu$mole/cm$^2$ of membrane, though membranes having smaller or larger membrane loads may be obtained. Assuming a membrane load of ~0.32 $\mu$mole/cm$^2$, reaction zones having the dimensions described above could each support the synthesis of about 0.12 $\mu$mole of compound per sheet of membrane in the reaction zone.

The apparatus may be constructed of any suitable materials, such as aluminum, stainless steel, PTFE, ceramics, and various types of plastics, glasses, or metals. Those portions of the apparatus which will contact the reagents or building blocks are preferably constructed of, or lined with, materials that are not degraded by the various reagents and solvents that will be used with the apparatus. An exemplary apparatus can be made using a glass reagent vessel connected via PTFE tubing to stainless steel endplates having fluid guides lined with PTFE inserts. In an apparatus employing a reaction zone assembly such as is shown at 66 in FIGS. 5 and 6, or at 86 in FIGS. 7, 8 and 9, the middle plates may be, for example, PTFE sheets (e.g., 0.005"–0.05" thick sheets), available, e.g., from McMaster-Carr (Los Angles, Calif.). Exemplary middle plates comprise 0.015" thick PTFE sheets.

Figure 11:
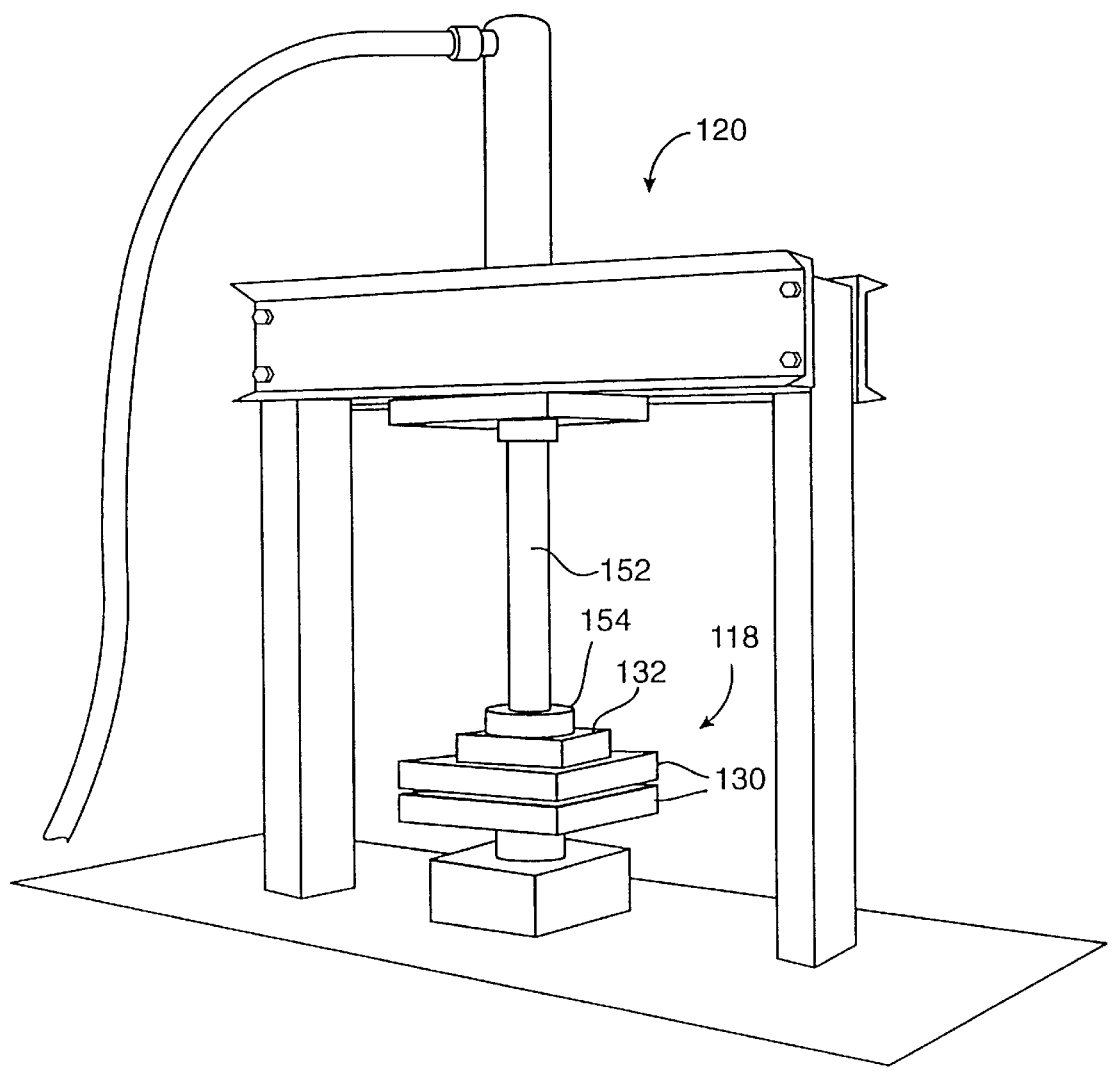
FIG. 11 is a perspective view of an exemplary apparatus for producing a combinatorial collection of compounds according to the invention.
Figure 12:
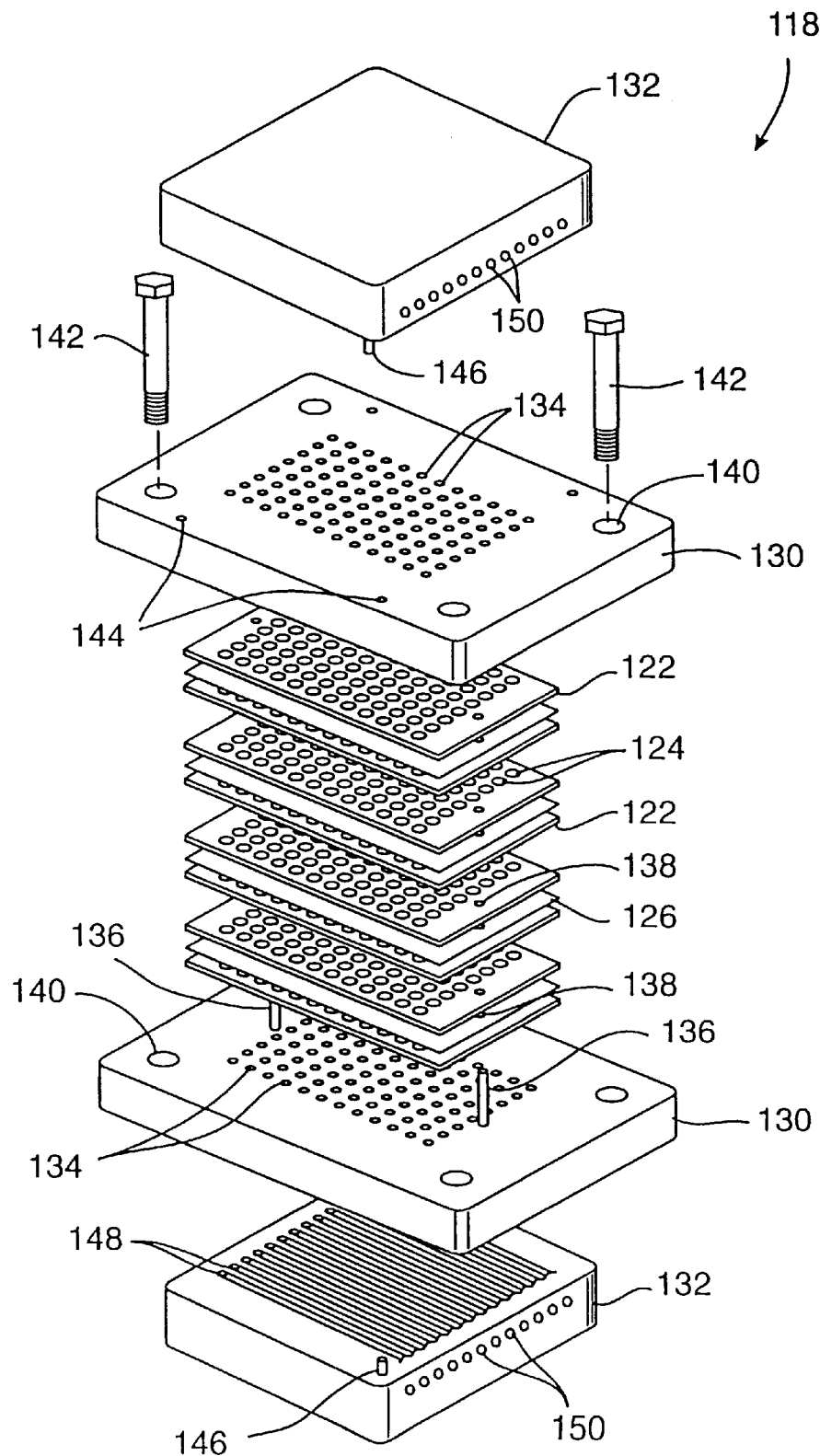
FIG. 12 is an exploded view of the reaction zone assembly shown in the apparatus of FIG. 11.
Figure 13:
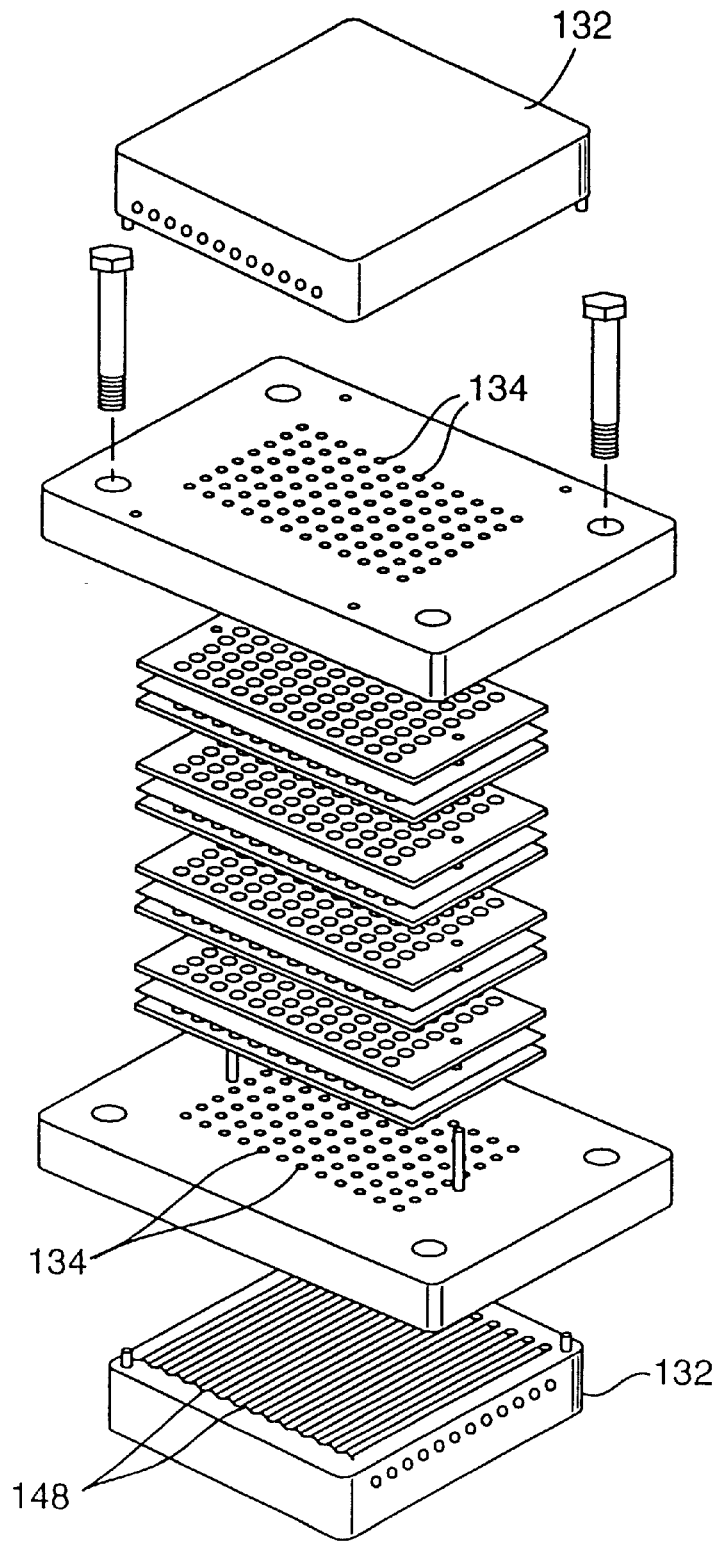
FIG. 13 is an exploded view of the reaction zone assembly of FIG. 12, with manifold plates rotated 90° relative to FIG. 12.

Referring now to FIGS. 11, 12 and 13, yet another alternative embodiment of a reaction zone assembly 118 will be described. Reaction zone assembly 118 is contained in a hydraulic press 120 to supply a clamping force, and is configured such that it may be used as an alternative to reaction zone assembly 66 of FIGS. 5–6. As best seen in FIGS. 12 and 13, reaction zone assembly 118 comprises a plurality of middle plates 122 with each middle plate including a two dimensional array of circular apertures 124. The middle plates are arranged in sets of two middle plates per set, with a membrane 126 between the middle plates of each set. When middle plates 122 are clamped together as shown in FIG. 11, a three dimensional array of reaction zones, similar to reaction zones 74 in FIG. 6, is formed. As was the case for reaction zone assembly 66 shown in FIGS. 5–6, the solid supports in each zone are regions of a sheet of membrane 126. The membranes and reaction zones have characteristics as described above, e.g., they typically contain an initial set of chemical building blocks thereon, at least on regions corresponding to reaction zones.

Reaction zone assembly 118 further includes a pair of clamping plates 130 and a pair of manifold plates 132. Clamping plates 130 each include a plurality of holes 134 spaced to correspond to the spacing of the reaction zones, with each hole 134 preferably being smaller than holes 124 in middle plates 122. One of clamping plates 130 further includes a pair of alignment pins 136 to engage alignment holes 138 in middle plates 122 and membranes 126, thus facilitating alignment of a column of reaction zones. Clamping plates 130 further include bolt holes 140 to allow the portion of reaction zone assembly 118 between the clamping plates to be secured together by bolts 142 and manipulated as a unit ("reaction block") independently of manifold plates 132. The reaction block can, of course, be secured by other means as well, including spring clamps, elastic straps and the like. Clamping plates 130 also include alignment holes 144 adapted to mate with alignment pins 146 of manifold plates 132 to align channels 148 of manifold plates 132 with rows or columns of holes 134 in clamping plates 130. Manifold plates 132 further include ports 150 in fluid communication with channels 148, for connecting to sources of reagents, sample collection vials, waste lines, etc.

Manifold plates 132 can be rotated 90° relative to the reaction block, as is illustrated in a comparison of FIGS. 12 and 13. The reaction block in FIGS. 12 and 13 has the dimensions X=12, Y=8, and Z=4. In FIG. 12, channels 148 of manifold plates 132 are aligned with (x,z) planes of reaction zones and holes 134 having a common y coordinate. In FIG. 13, however, channels 148 are aligned with (y,z) planes of reaction zones and holes 134 having a common x coordinate. Note that where the number of rows is not the same as the number of columns, the manifold plates are designed to have a number of channels equal to the greater of X and Y. Further, each channel has a length sufficient to cover the greater of X and Y. In the example illustrated in FIGS. 12 and 13, the reaction zones are distributed in 8×12 arrays, so manifold plates 132 each contain 12 channels, with each channel having a length sufficient to cover 12 adjacent reaction zones.

Although manifold plates 132 are shown with channels 148 open to face clamping plates 130, it will be appreciated that channels 148 may be enclosed inside manifold plates 132. In such embodiments, fluid communication between channels 148 and holes 134 (when reaction zone assembly 118 is clamped together as shown in FIG. 11 and described below) is provided by a plurality of manifold holes in manifold plates 132. The manifold holes put the channels in fluid communication with holes 134. This variation reduces the potential for reagents to spill from the channels when the manifold plates are separated from the reaction block for the 90° rotation.

Gaskets may optionally be provided between clamping plates 130 and manifold plates 132. The gaskets are patterned to match the geometry of openings in manifold plates 132. For example, in embodiments where the manifold plates have exposed channels, the gaskets have elongated openings corresponding to the channels, whereas in embodiments where the manifold plates have an array of exposed holes corresponding to holes 134, the gaskets have a corresponding array of holes. Gaskets may be fashioned from, e.g., PTFE sheets or "KALREZ" perfluoroelastomer (Dow Corning Chemical Company, Midland, Mich.; available from Bay Seal Co., Hayward, Calif.).

To achieve a seal between adjacent zones on a (x,y) reaction plane, the manifold plates are clamped around the reaction block using, for example, a press. FIG. 11 illustrates reaction zone assembly 118 in a standard 10-ton hydraulic lab press, such as is available from McMaster-Carr (Los Angles, Calif.). The press force, delivered via a piston 152, is distributed over top manifold plate 132 with a stainless steel force distribution plate 154. If no special structures or "force directors" are used to direct the clamping force, i.e., the device is made using substantially flat middle plates 122, and if the middle plates have a compliance similar to that of PTFE (e.g., middle plates made from ~0.01"–0.05" thick PTFE sheets), then a clamping force of approximately 150–300 pounds per square inch (psi), calculated with respect to the plate surface outside the reaction zones, is typically sufficient to form effective seals between adjacent reaction zones separated from one another by at least about 2 mm. For example, adjacent 7 mm reaction zones arranged in a 12×12 array and spaced at 9 mm can be sealed from one another using a total clamping or compression force of about 3–4 tons. A 24×24 array of such zones can be sealed with a total force of about 12–15 tons, and a 36×36 array can be sealed with a total force of about 27–30 tons.

Figure 14:
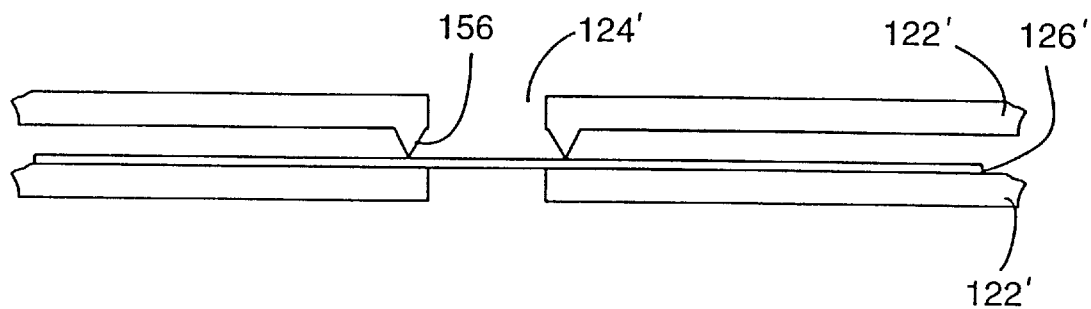
FIG. 14 is a cross-sectional side view of a reaction zone comprising a membrane and 2 middle plates with force directors.

The clamping force may be supplied by a mechanism other than a hydraulic press. Examples of such alternate mechanisms include, but are not limited to, pneumatic presses, various types of clamps, bolts (e.g., bolts 142 in FIG. 12), and the like, as can be appreciated by one of skill in the art. Additionally, as shown in FIG. 14, at least one of middle plates 122' can be provided with force directors 156 surrounding holes 124'. Such force directors focus the clamping force in discrete regions surrounding each reaction zone on membrane 126', and thus act to decrease the clamping force required to seal off a reaction zone from adjacent reaction zones.

Middle plates may fashioned from any suitable material that is resistant to the chemicals, reagents, building blocks, solvents and the like that will be used with reaction zone assembly 118 during chemical synthesis. Exemplary materials include PTFE (e.g., 0.01"–0.05" thick PTFE sheets), corrosion-resistant metal (e.g., stainless steel plates), "KALREZ", polystyrene, and the like. In a preferred embodiment, all middle plates are PTFE sheets. In other suitable embodiments, particularly embodiments employing a force director, one plate of each set of middle plates is a PTFE sheet, and the other is a stainless steel plate. Forming an effective seal is substantially facilitated if at least one of the pair of middle plates flanking the membrane is elastic enough to deform slightly under the compression used to form the seal. This allows the use of plates having slight surface irregularities (which might otherwise provide paths for fluid communication between adjacent reaction zones), since the irregularities are smoothed out by application of the clamping force. An exemplary material having such desirable elastic properties is PTFE.

Clamping plates and manifold plates are similarly made from materials which will resist corrosion by the reagents and solvents used with the device. Further, materials used for these plates (particularly the clamping plates) are preferably stiff enough (have a high modulus of elasticity) to avoid significant deformation under the clamping forces applied to maintain seals between adjacent reaction zones, in order to distribute the clamping force evenly across all reaction zones. An exemplary material having such characteristics is steel (e.g., stainless steel). If additional corrosion resistance is desired, the holes or channels in end plates, clamping plates or manifold plates can be lined with a corrosion-resistant material, such as PTFE.

Figure 15:
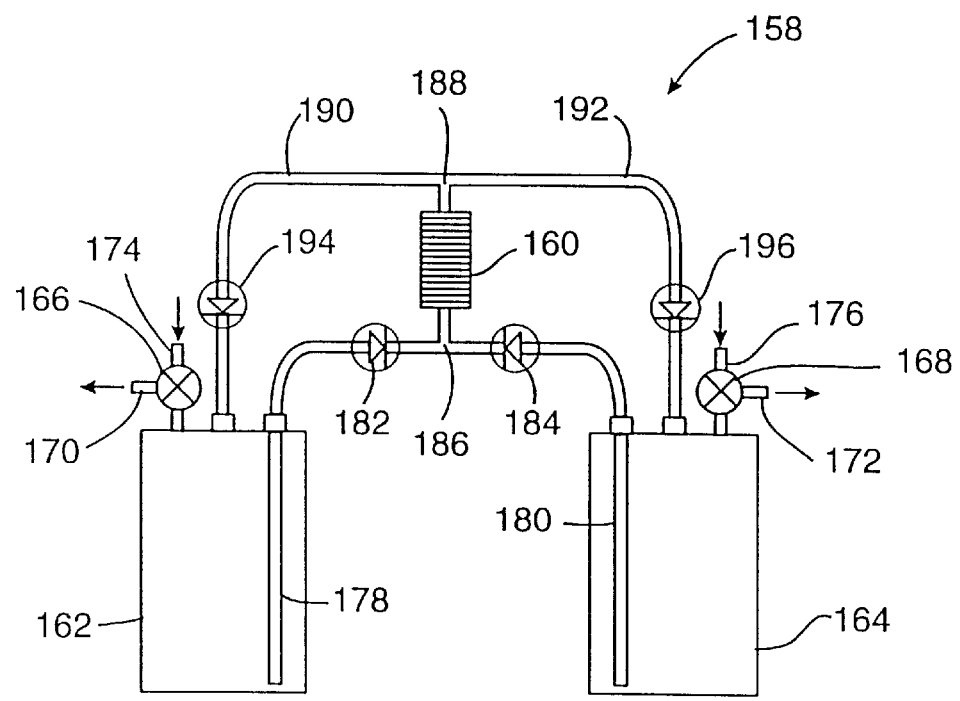
FIG. 15 is a reagent transfer mechanism, employing a pair of reagent vessels, suitable for use with the invention.

FIG. 15 illustrates a device 158, suitable for delivering reagents to a reaction zone assembly of the invention, that does not involve a "pumping" mechanism but is nevertheless suitable for circulating a reagent solution through a stack or bank of reaction zones or vessels, shown schematically at 160. Since device 158 includes no moving parts in the solution flow path (except one-way flow controllers), it is well suited for use with reactions conducted at very high or cold temperatures. Device 158 includes two sealed reagent holding vessels, 162 and 164. Vessels 162 and 164 are pressurized and/or vented via gas valves 166 and 168, respectively, which in turn each contain a vent port 170 and 172, respectively, and a gas inlet port 174 and 176, respectively. Vessels 162 and 164 further contain reagent tubes 178 and 180, respectively, which are open at their bottom ends and lead via respective one-way flow controllers 182 and 184 to a lower T-junction 186. The common limb of T junction 186 is connected to an inlet port or manifold (not shown) of reaction zone bank 160. The outlet port or manifold (not shown) of reaction zone bank 160 is connected to the common limb of upper T-junction 188, which splits into return tubes 190 and 192. Tubes 190 and 192 in turn lead, via one-way flow controllers 194 and 196, respectively, into the tops of respective reagent vessels 162 and 164.

In operation, reagent holding vessel 162 is filled with a selected reagent and sealed. Gas inlet port 176 is closed, and vent port 172 is opened. Vent port 170 is closed, and vessel 162 is pressurized with an inert gas, such as nitrogen or argon via gas inlet port 174. The increased pressure causes reagent in vessel 162 to flow up reagent tube 178, through one-way controller 182 and into lower T-junction 186. Since reagent is prevented from flowing the wrong-way past controller 184, it is forced into reaction zone bank 160. Upon exiting zone bank 160, the reagent flows via upper T-junction 188 into return tubes 190 and 192. However, since vessel 162 is pressurized and vessel 164 is not, the reagent will flow via tube 192, through one-way flow controller 196, and into vessel 164. When a sensor (e.g., an optical sensor) detects that the level of reagent in vessel 162 had dropped below a pre-selected point, the cycle is reversed: gas inlet port 174 and vent 172 are closed; vent 170 and gas inlet port 176 are opened; and the reagent in vessel 164 is circulated back to vessel 162 via reaction zone bank 160 as described above.

IV Synthesis Methods of the Invention

A. Mechanics

Referring back to FIGS. 3 and 4, an exemplary method for synthesizing chemicals onto supports 36 will be described. Supports 36 preferably comprise commercially available beads as are known in the art. The supports 36 are preferably each provided with an initial building block derivatized thereon before they are placed into reaction vessels 30. A record is maintained to keep track of which supports and their associated building blocks are stored in each of the reaction vessels 30. For example, in one preferred configuration, each middle plate 24 has supports with a first building block. To maximize the number of chemical combinations that may be produced, the building block on the supports in each of the middle plates is different from building blocks in other middle plates, i.e., each middle plate has a different initial building block thereon.

A set of second building blocks from reagent sources 44 are then circulated through vertical plane, e.g., (x,z) planes, as illustrated in FIGS. 3 and 4, so that each of the solid supports in a given plane will receive the same second building block. The amount of building block delivered is usually 1 to 100 equivalents, preferably about 10 equivalents, at 100 mM concentration. The second building blocks are allowed to react, under appropriate reaction conditions, with the initial building blocks on the solid supports. The second building blocks are preferably continuously circulated during this reaction phase. If the reaction takes place at temperatures other than ambient, the reaction vessel assembly and/or the reagent sources are maintained at selected temperatures to maintain the temperature of the reaction at the proper temperature. To maximize the number of chemical combinations, each plane preferably receives a different second building block. After completion of the reaction coupling the second building blocks to the first or initial building blocks, each support contains an intermediate product. Circulation of the building block solution is then stopped, the second building block solutions are drained from the reagent vessels, and the reagent vessels may be filled with suitable wash solutions to wash the solid supports. Following any wash steps, the reagent vessels are drained.

Middle plates 24 are then rotated 90° relative to end plates 26 and 28 so that manifolds 42 are aligned with reaction planes that are perpendicular to the reaction planes that just received the second building block. For example, the (y,z) planes would now be aligned with manifolds 42. The reagent vessels are filled with a set of third building blocks, and this set is then circulated through each of the (y,z) planes to add the third building block to each of the intermediate products on the solid supports as described above. To maximize the number of chemical combinations, the chemicals circulated through the (y,z) planes will preferably be different from each other and be different from any of the chemicals used in the first or second building blocks. In this way, the number of combinatorial compounds produced will equal the number of reaction vessels. If any of the chemicals in reagent sources 44, or chemicals initially applied to solid supports 36, are duplicated, the number of combinatorial compounds will decrease.

Following the last synthesis step, the synthesized compounds will typically be cleaved from the solid supports into collection vessels or plates. A number of cleavage methods are known in the art. The particular cleavage reaction will depend on the type of linker used to attach the first building block to the solid support, as is discussed below. For cleavage, reaction zones containing different synthesized compounds are handled separately. If the reactions were carried out in reaction vessels contained in a plurality of stacked (x,y) planes, the planes are separated, and the compounds are transferred (with or without the solid supports) to sample plates for storage or subsequent manipulations. To transfer the compounds without the solid supports, the compounds must of course first be cleaved from the solid supports using the appropriate cleavage conditions as detailed below. If the reactions were carried out on membranes, sheets of membrane containing the reaction zones may be placed into a cleavage station (e.g., an apparatus similar to the synthesis device described above, except with only a single level or "z" value of reaction zones. Cleavage solution (e.g., TFA) is then passed through the device to cleave the compounds, and the compounds are eluted into a collection plate. Alternatively, portions of membrane (e.g., disks) corresponding to the reaction zones may be "punched out" from the sheets, and placed into individual vessels containing the cleavage solution.

In situations where the (x,y,z) dimensions of the reaction zone assembly are such that X≠Y (such as is illustrated in FIGS. 12 and 13), it will be appreciated that the apparatus will be constructed to (i) be able to simultaneously supply a number of vertical reaction planes that is the greater of X or Y, and (ii) have fluid guides capable of supplying, in any given reaction plane, a number of columns that is the greater of X or Y. Accordingly, the apparatus will have an excess of plumbing, fluid guides, manifolds, reagent vessels, and the like at least one of the two orthogonal positions that the end plates assume relative to the stack of middle plates, and this excess capacity under such conditions will typically remain idle and/or be turned "off".

B. Chemistry

The present invention may be used in the synthesis of oligomeric as well as non-oligomeric compounds. Solid phase syntheses of oligomeric compounds, such as polynucleotides, polypeptides peptide-nucleic acids (PNAs), and the like, are well-known (see, e.g., Epton, R., 1994; incorporated herein by reference). Solid phase techniques suitable for combinatorial synthesis of non-oligomeric small molecules are also known in the art (see, e.g., Gordon, et al, 1994; Thompson and Ellman, 1996; Früchtel and Jung, 1996; and Patel and Gordon, 1996; all incorporated herein by reference). Such techniques have been applied, for example, to the preparation of libraries of compounds based on a wide variety of heterocyclic structures, including benzodiazepines (Bunin and Ellman, 1992; Bunin, et al., 1994; Plunkett and Ellman, 1995), hydantoins (Hobbs DeWitt, et al., 1993), pyrrolidines (Murphy, et al., 1995; Gallop, et al., 1996; Maclean, D., 1997), thiazolidinones (Holmes, et al., 1995; Holmes, 1996), thiazolidines (Patek, et al., 1995), diketopiperazines (Gordon and Steele, 1995; Szardenings, et al., 1997), diketomorpholines (Szardenings, et al., 1997), tetrahydrofurans (Beebe, et al., 1992), lactones (Moon, et al., 1992), isoxazoles and isoxanolines (Pei and Moos, 1994), and other compounds. Accordingly, these techniques and others can be used in conjunction with the methods and devices of the present invention.

By way of example, the synthesis of a library of thiazolidinones, metathiazanones, and derivatives thereof, as detailed in Holmes (1996; incorporated herein by reference), comprises the following steps: first binding an amine component to a solid support. Preferably, the amine component will comprise a primary amine, and more preferably, an amino acid, a peptide, a mono-substituted hydrazine derivative or a hydrazide derivative. The heterocycle is then formed by treating the solid support-bound amine component, either sequentially or simultaneously, with a carbonyl component, preferably an aldehyde, and a thiol component, preferably an α-mercapto carboxylic acid or a β-mercapto carboxylic acid. The thiol component is immobilized on the support and the heterocycle is formed by treatment of the immobilized component with a carbonyl component, preferably an aldehyde, and an amine component, preferably an α-amino acid, a peptide, a mono-protected or mono-substituted hydrazine derivative or a hydrazide derivative.

Examples of resins suitable for solid-phase syntheses according to the present invention include glass, gold or other colloidal metal particles, and any of a large variety of polymer resins, typically made from cross-linked polymers, such as polystyrene, polystyrene-CHO, formylpolystyrene, acetyl polystyrene, chloroacetyl polystyrene, minomethyl polystyrene, carboxypolystyrene, Merrifield resin (cross-linked chloromethylated polystyrene). Other suitable resins include, but are not limited to, latex, cross-linked hydroxymethyl resin, 2-chlorotrityl chloride resin, trityl chloride resin, 4-benzyloxy-2'4'-dimethoxybenzhydrol resin, trityl alcohol resin, triphenyl methanol polystyrene resin, diphenylmethanol resin, benzhydrol resin, succinimidyl carbonate resin, p-nitrophenyl carbonate resin, imidazole carbonate resin, polyacrylamide resin, and the like. Resins such as those described above may be obtained, for example, from Aldrich Chemical Company (Milwaukee, Wis.), or from Advanced ChemTech, Inc.(Louisville, Ky.). Additional suitable resins include "ARGOGEL", a grafted polyethylene glycol-polystyrene (PEG/PS) copolymer (Argonaut Technologies, San Carlos, Calif.) and "TENTAGEL" (Rapp Polymere GmbH, Germany).

Solid supports such as resins or membranes used with the present invention typically contain or are derivatized with any of a number of chemically reactive groups, which are in turn used to attach a linker (preferably a cleavable linker) to the support or resin. The linker in turn terminates in a suitable synthesis initiation site (reactive group) which is optionally protected, and which is used to attach the first building block to the solid support. Examples of suitable reactive groups include alcohol, amine, hydroxyl, thiol, carboxylic acid, ester, amide, halomethyl, isocyanate and isothiocyanate groups.

Exemplary cleavable linkers include chemically-cleavable linkers and photocleavable linkers. Chemically-cleavable linkers include sulfoester linkages (e.g., a thiolated tagged-molecule and a N-hydroxy-succinimidyl support), cleavable by increasing pH (using, e.g., ammonium hydroxide), benzylhydryl or benzylamide linkages (e.g., a Knorr linker), cleavable by increasing acid concentration (using, e.g., trifluoroacetic acid (TFA)), and disulfide linkages (e.g., a thiolated tagged-molecule and a 2-pyridyl disulfide support, such as thiolsepharose from Sigma), cleavable with DTT (dithiothreitol). Suitable photocleavable linkers (reviewed by Lloyd-Williams, et al., 1993) include 6-nitroveratryoxycarbonyl (NVOC), α-methyl-6-nitroveratryl alcohol and other NVOC related linker compounds (PCT patent publication Nos. WO 90/15070 and WO 92/10092), ortho-nitrobenzyl-based linkers (Barany, et al., 1985) and phenacyl based linkers (Bellof and Mutter, 1985).

V Utility

Following synthesis, the compounds of the library are typically tested for a desired activity, e.g., agonist or antagonist activity, in an in vitro biological assay. Although the compounds are typically eluted from the solid supports prior to such assays, they may, if desired, be left attached to the supports. Performing such a subsequent assay serves at least two purposes: (i) discovery of new compounds with biological activity in a given screening assay, and (ii) development of a relationship between the structural variations contained within the series of compounds and biological potency (i.e., a structure activity relationship (SAR)).

Assays and screens of libraries of compounds are known in the art (see, e.g., Dower, et al., 1997, incorporated herein by reference). Examples of suitable assays include receptor binding assays (screening for receptor agonists or antagonists), functional enzyme assays (measuring competitive or noncompetitive inhibition of the catalyzed reaction), and the like. The assays may be used in a variety of contexts, including screens for pharmaceutical agents, veterinary agents, agricultural agents, diagnostic reagents, and the like.

VI Advantages of the Invention

The invention provides a simple method and apparatus for the parallel synthesis of large numbers of compounds in preparative quantities. The invention offers a number of advantages over prior art devices and methods. For example, there is no need to tag or encode the substrates on which the compounds are synthesized, since the identity of the compound in each reaction zone is determined based on the location of that reaction zone in the array. By varying the number of sheets of membrane in the reaction zones, the amount of compound synthesized at each zone can be varied to suit the requirements of the practitioner. Furthermore, the systems and methods of the invention minimize the amount of tubing and number of valves required for synthesis of large numbers of compounds.

In addition, the format in which the compounds are synthesized offers substantial advantages over prior art methods. For example, distribution of libraries of compounds is presently accomplished by sending multiwell plates containing the individual compounds in solution in the different wells. Such solution-based distribution suffers from a number of disadvantages, including potential breakdown of labile compounds, potential need for refrigeration/freezing, susceptibility to accidental spills (e.g., lab technician drops a stack of plates), difficulty in shipping, etc. Bead-based libraries where beads containing different compounds are segregated from one another also suffer from some of the above problems, including susceptibility to accidental spills.

In contrast, membrane sheets containing compounds synthesized as described herein can be conveniently stored in loose-leaf notebooks and distributed using standard envelopes. Each sheet (which can contain 100 or more reaction zones) needs to be marked only with an identifying number or code in a consistent orientation (so the orientation of the x,y axes defining the reaction zones is ascertainable). To assay the compounds in a multi-well format, all or a portion of each reaction zone can be punched out, distributed to "cleavage" plates, and the compounds can be cleaved from the solid supports and assayed as described above.

The invention has now been described in detail. All references cited above are hereby incorporated by reference. Further, it will be appreciated that various modifications and changes may be made without departing from the invention. Therefore, the scope and content of this invention are not limited by the foregoing description. Rather, the scope and content are to be defined by the following claims.

What is claimed is:

1. A system for synthesizing chemicals on membrane supports in a parallel manner, the system comprising:
   a plurality of middle plates, with each middle plate comprising a plurality of holes arranged in a two dimensional array having x and y axes, wherein the middle plates are stackable on each other and adapted to receive a plurality of interleaving sheets of membrane to form a three dimensional array of reaction zones having x, y and z axes and defining Z (x,y) reaction planes, wherein each Z(x,y) reaction plane has a different sheet of membrane; and
   a pair of end plates, wherein the middle plates are located between the end plates, and wherein the end plates include an array of fluid guides corresponding to said array of reaction zones, to allow for selective routing of reagents through the reaction zones such that the same reagent passes through the reaction zones having a common z axis.

2. The system of claim 1, wherein the middle plates form a stack which is rotatable relative to the end plates to align the fluid guides with selected reaction zones.

3. The system of claim 2 wherein the fluid guides in at least one of the end plates include an array of manifolds, where each manifold is aligned with one group of reaction zones when the end plate is in a first orientation and with a different group of reaction zones when the end plate is in a second orientation.

4. The system of claim 1, wherein at least some of the fluid guides include a narrowing orifice to control the flow of chemicals through the reaction zones.

5. The system of claim 1, wherein the middle plates are formed of polytetrafluoroethylene (PTFE) sheets.

6. The system of claim 1, wherein said middle plates have a thickness of between about 0.005" and 0.1".

7. The system of claim 1, further comprising a compression means effective to compress the end plates together with sufficient force to isolate reaction zones in each (x,y) reaction plane from one another by a fluid-tight seal.

8. The system of claim 7, wherein the compression means is a hydraulic press.

9. The system of claim 7, further comprising
   a reagent vessel,
   at least one length of tubing connecting a subset of said fluid guides with said reagent vessel, and
   a pressure source for delivering fluid from said reagent vessel to said fluid guides by way of said tubing.

10. A method of synthesizing a library of compounds, comprising
    providing a plurality of middle plates, each middle plate comprising a plurality of holes arranged in a two dimensional array having x and y axes when the plates are aligned;
    interposing, between said plurality of middle plates, a sheet of membrane capable of serving as a solid support for chemical synthesis, wherein the sheet of membrane is a continuous sheet disposed across said holes;
    compressing said plates together to form an array comprised of a plurality of sheets of membranes interposed between a plurality of middle plates, resulting in an array of discrete reaction zones corresponding to the array of holes, where each reaction zone contains a portion of each said continuous sheet of membrane, and where said compressing creates a fluid-tight seal between adjacent reaction zones;
    delivering a first building block to the reaction zones;
    delivering a second building block to the reaction zones such that zones having a common x coordinate value receive the same second building block; and
    delivering a third building block to the reaction zones such that zones having a common y coordinate value are contacted with the same third building block; and
    wherein a library of compounds is formed by the reaction of the second and third building blocks in the different reaction zones.

11. The method of claim 10, wherein the sheets of membrane are pre-derivatized with a first building block, and said library of compounds is formed by the reaction of the first, second and third building blocks in the different reaction zones.

12. The method of claim 10, wherein said sheets of membrane are selected from the group consisting of polypropylene membrane, polyethylene membrane, polytetrafluoroethylene (PTFE) polyacrylate terpolymer membrane, PTFE polyacrylamide terpolymer membrane, and fluoropolymer membrane grafted with styrene, acrylate, or acrylamide.

13. The method of claim 10, wherein said membrane is a PTFE polyacrylate terpolymer membrane or a polyvinylidene fluoride membrane.

14. The method of claim 10, wherein said middle plates are formed of polytetrafluoroethylene (PTFE) sheets.

15. The method of claim 10, wherein said middle plates have a thickness of between about 0.005" and 0.1".

16. The method of claim 10, wherein the middle plates and sheets of membrane form a stack, said method further includes providing a pair of end plates flanking said stack, and said compressing includes compressing the end plates together.

17. The method of claim 16, wherein the end plates include an array of fluid guides corresponding to said array of reaction zones, to allow for selective routing of reagents through the reaction zones.

18. The method of claim 10, wherein said compressing is accomplished using a pneumatic or hydraulic press.

19. The method of claim 10, wherein said compressing is accomplished using a clamp or set of bolts.

20. A method of synthesizing a library of compounds, comprising providing at least three middle plates, each middle plate comprising a plurality of holes arranged in a two dimensional array having x and y axes when the plates are aligned;

interposing, between adjacent ones of said plates, a separate sheet of membrane capable of serving as a solid support for chemical synthesis, wherein each sheet of membrane is a continuous sheet positioned across multiple holes of said plates;

compressing said plates together to form a three dimensional array of discrete reaction zones having x, y, and z axes and defining Z (x,y) reaction planes, wherein Z equals at least two, where each reaction zone contains a portion of said sheet of membrane, and where said compressing creates a fluid-tight seal between adjacent reaction zones;

delivering a second building block to the reaction zones such that zones having a common x and z coordinate value receive the same second building block; and delivering a third building block to the reaction zones such that zones having a common y and z coordinate value are contacted with the same third building block; and wherein a library of compounds is formed by the reaction of the second and third building blocks in the different reaction zones.

21. The method of claim 20, wherein each sheet of membrane is pre-derivatized with a different first building block, and said library of compounds is formed by the reaction of the first, second and third building blocks in the different reaction zones.

22. The method of claim 20, wherein said membranes are selected from the group consisting of polypropylene membrane, polyethylene membrane, polytetrafluoroethylene (PTFE) polyacrylate terpolymer membrane, PTFE polyacrylamide terpolymer membrane, and fluoropolymer membrane grafted with styrene, acrylate, or acrylamide.

23. The method of claim 20, wherein said membranes are a PTFE polyacrylate terpolymer membrane or a polvinylidene fluoride membrane.

24. The method of claim 20, wherein said middle plates are formed of polytetrafluoroethylene (PTFE) sheets.

25. The method of claim 20, wherein said middle plates have a thickness of between about 0.005" and 0.1".

26. The method of claim 20, wherein the middle plates and sheets of membrane form a stack, said method further includes providing a pair of end plates flanking said stack, and said compressing includes compressing the end plates together.

27. The method of claim 26, wherein the end plates include an array of fluid guides corresponding to said array of reaction zones, to allow for selective routing of reagents through the reaction zones.

28. A method of synthesizing a library of compounds, comprising providing at least three middle plates, each middle plate comprising a plurality of holes arranged in a two dimensional array having x and y axes when the plates are aligned;

interposing, between adjacent ones of said plates, a separate sheet of membrane capable of serving as a solid support for chemical synthesis, wherein each sheet of membrane is pre-derivatized with a different first building block and wherein each sheet of membrane is a continuous sheet positioned across multiple holes of said plates;

compressing said plates together to form a three dimensional array of discrete reaction zones having x, y, and z axes and defining Z (x,y) reaction planes; wherein Z equals at least two, where each reaction zone contains a portion of said sheet of membrane, and where said compressing creates a fluid-tight seal between adjacent reaction zones;

delivering a second building block to the reaction zones such that zones having a common x and z coordinate value receive the same second building block; and delivering a third building block to the reaction zones such that zones having a common y and z coordinate value are contacted with the same third building block; and wherein a library of compounds is formed by the reaction of the first, second and third building blocks in the different reaction zones.

* * * * *